United States Patent
Hanmura et al.

(10) Patent No.: US 7,094,279 B2
(45) Date of Patent: Aug. 22, 2006

(54) BLACK WATER-BASED INK COMPOSITION

(75) Inventors: Masahiro Hanmura, Nagano-ken (JP);
Tetsuya Aoyama, Nagano-ken (JP);
Kazuhiko Kitamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/995,930

(22) Filed: Nov. 22, 2004

(65) Prior Publication Data

US 2005/0126435 A1  Jun. 16, 2005

(30) Foreign Application Priority Data

Nov. 25, 2003 (JP) ............................. 2003-393918

(51) Int. Cl.
*C09D 11/00* (2006.01)
*B41J 2/01* (2006.01)
*B41M 5/00* (2006.01)

(52) U.S. Cl. ............................... 106/31.46; 106/31.48; 106/31.5; 106/31.52; 428/195.1; 347/100

(58) Field of Classification Search ............. 106/31.46, 106/31.48, 31.5, 31.52; 534/754; 428/195.1; 347/100
See application file for complete search history.

(56) References Cited

U.S. PATENT DOCUMENTS

| | | | |
|---|---|---|---|
| 1,235,253 A * | 7/1917 | Stebbins, Jr. ................ 534/813 |
| 5,262,527 A | 11/1993 | Gregory et al. |
| 5,536,819 A * | 7/1996 | Tamura et al. ............ 106/31.52 |
| 6,451,989 B1 * | 9/2002 | Beach et al. ................ 534/728 |
| 6,503,308 B1 * | 1/2003 | Stramel et al. ........... 106/31.27 |
| 6,749,674 B1 * | 6/2004 | Geisenberger et al. ... 106/31.52 |
| 2004/0020404 A1 * | 2/2004 | Popat et al. ................ 106/31.5 |
| 2004/0040466 A1 * | 3/2004 | Aoyama et al. ........... 106/31.52 |
| 2004/0053988 A1 * | 3/2004 | Taguchi et al. .............. 514/419 |
| 2005/0076806 A1 * | 4/2005 | Hanmura et al. ......... 106/31.48 |

FOREIGN PATENT DOCUMENTS

| JP | 03-091576 | 4/1991 |
|---|---|---|
| JP | 03-229770 | 10/1991 |
| JP | 3020660 | 1/2000 |

OTHER PUBLICATIONS

Patent Abstracts of Japan 03-229770 Filed: Oct. 11, 1991.
Patent Abstracts of Japan 03-091576 Filed: Apr. 17, 1991.
Memorandum to the committee on ways and means of the United States House of Representatives on Proposed Tariff Legislation, Jun. 2000.

* cited by examiner

*Primary Examiner*—Helene Klemanski
(74) *Attorney, Agent, or Firm*—Ladas & Parry LLP

(57) ABSTRACT

The present invention provides a black water-based ink composition that has excellent resistance to light and ozone, has an excellent hue as a black ink, and also has excellent storage stability. A black water-based ink composition is prepared by combining at least one type of black dye selected from the group consisting of compounds expressed by the following formula (1) and salts thereof:

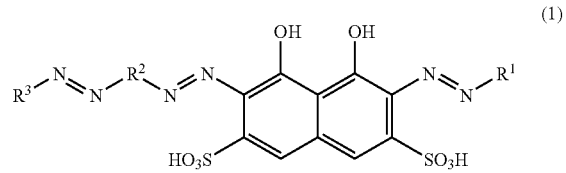

(1)

and at least one type of dye other than a black dye, and the hue is adjusted by adding the dye other than a black dye. It is preferable if the dye other than the black dye is a compound that has at least one type of group selected from the group consisting of an —$SO_3H$ group, —COOH group, —$SO_3M$ group, and —COOM group (where M in these groups is an alkali metal atom), and is not an ammonium salt or a salt with an organic cation. It is also preferable for the dye other than the black dye to be a dye selected from the group consisting of yellow dyes and magenta dyes.

15 Claims, No Drawings

BLACK WATER-BASED INK COMPOSITION

BACKGROUND OF THE INVENTION

1. Field of the Invention

The present invention relates to a black water-based ink composition that can be used favorably in inkjet recording, that has excellent storage stability, and that also has excellent hue, and to an inkjet recording method in which this ink composition is used, and recorded material produced by this recording method.

2. Description of the Related Art

Inkjet recording is a known method in which an ink composition is discharged in the form of droplets from a narrow nozzle, and recording is performed by causing the ink to adhere to the surface of a recording medium in the shape of text or graphics. Inkjet recording methods that have seen practical use include (i) a method in which an electrostrictive device is used to convert electrical signals into mechanical signals, and an ink composition held in a nozzle head portion is intermittently discharged from the nozzle head by these mechanical signals and made to adhere to the surface of a recording medium in the shape of text or graphics, and (ii) a method in which the portion of the nozzle head that is extremely close to the discharge component is rapidly heated so as to generate bubbles in the ink composition held in the nozzle head portion, and the volumetric expansion of these bubbles causes the ink composition to be intermittently discharged from the nozzle head and adhere to the surface of the recording method in the shape of text or graphics.

The ink composition used in inkjet recording is generally a solution obtained by dissolving various dyes in water, an organic solvent, or a mixture of these. These ink compositions need to be safer and afford better printing performance than inks used for fountain pens, ballpoint pens, and other such writing instruments.

Furthermore, in recent years inkjet printers have come to be used in the production of printed materials for advertising, and printed materials produced by an inkjet recording method featuring a water-based ink composition are used not only indoors, but also outdoors. This means that the printed material may be exposed to sunlight and/or light from various light sources, and to chemical substances contained in the atmosphere such as ozone, nitrogen oxides, and sulfur oxides, and must not be degraded by these over time. Various studies into colored inks such as yellow, magenta, and cyan have been conducted in an effort to meet these requirements. Progress has been made with black inks, depending on the dye density and what proportion of the image is accounted for by black ink, because the ink itself is more durable than colored inks, for example. However, black ink is very important from the standpoint of achieving good contrast in an image, and development has been accelerating in recent years along with improvements to the characteristics of colored inks.

In the midst of all this, a disazo dye with the following structure, for example, is known as a dye capable of improving the gas resistance, and particularly the ozone resistance, of an ink composition in which a dye is used as a colorant (see Japanese Laid-Open Patent Application H3-229770 and Japanese Laid-Open Patent Application H3-91576, for example).

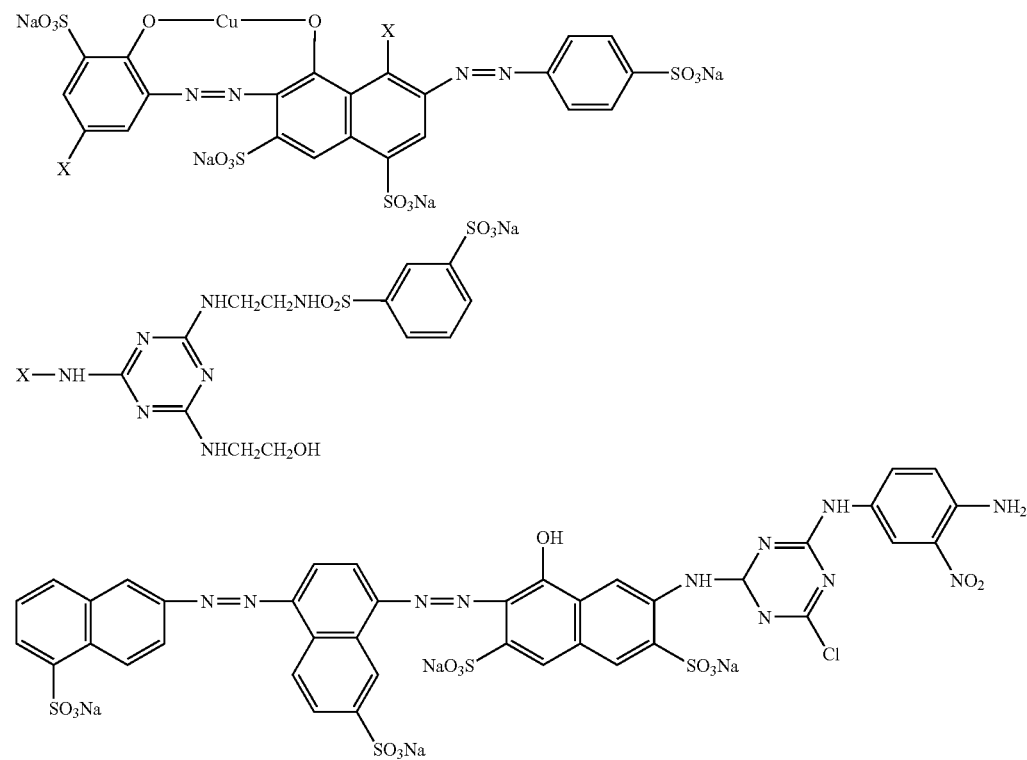

However, even an ink composition containing the above-mentioned dye still has inadequate light resistance and ozone resistance, and when its printed material is exposed to light, ozone, and the like, the quality thereof deteriorates over time, resulting in problems such as fading.

SUMMARY OF THE INVENTION

As discussed above, while there is a need for a black water-based ink composition with superior resistance to light and ozone, there is also a need for a black water-based ink composition to have the desired hue, such as neutral, and for the ink composition itself to have excellent storage stability.

The present invention provides a black water-based ink composition that has excellent resistance to light and ozone, allows the production of printed material that retains a high level of image quality over an extended period, and also has excellent hue as a black ink, and also provides an inkjet recording method that makes use of this ink composition, and recorded material produced by this inkjet recording method.

The black water-based ink composition of the present invention contains at least one type of black dye selected from the group consisting of compounds expressed by the following formula (1) and salts thereof:

(1)

$$R^3\text{-}N\text{=}N\text{-}R^2\text{-}N\text{=}N\text{-}\underset{HO_3S}{\overset{OH\quad OH}{\bigcirc\bigcirc}}\text{-}N\text{=}N\text{-}R^1$$

(in the formula (1), $R^1$ is a phenyl group having a substituent or a naphthyl group having a substituent, $R^2$ is a phenylene group having a substituent or a naphthylene group having a substituent, $R^3$ is a 5- to 7-member heterocyclic group having a substituent and at least one double bond, and the substituents in $R^1$ to $R^3$ are independently selected from the group consisting of OH, $SO_3H$, $PO_3H_2$, $CO_2H$, $NO_2$, $C_1$ to $C_4$ alkyl groups, alkyl groups having a substituent, $C_1$ to $C_4$ alkoxy groups, alkoxy groups having a substituent, amino groups having a substituent, and phenyl groups having a substituent), and at least one type of dye other than said black dye, wherein the hue is adjusted by adding the dye other than the black dye.

With the black water-based ink composition of the present invention, the compound expressed by the formula (1) is preferably a compound expressed by the following formula (2)

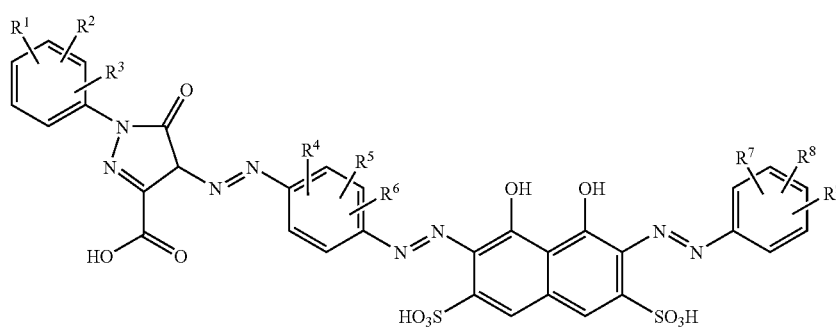

(2)

(in the formula (2), $R^1$ to $R^9$ are independently selected from the group consisting of H, OH, $SO_3H$, $PO_3H_2$, $CO_2H$, and $NO_2$).

Further, with the black water-based ink composition of the present invention, the dye other than the black dye that is contained in the black water-based ink composition is preferably a compound that has at least one type of group selected from the group consisting of an —$SO_3H$ group, —COOH group, —$SO_3M$ group, and —COOM group (where M in these groups is an alkali metal atom), has no primary amino group, and is not an ammonium salt or a salt with an organic cation.

With the black water-based ink composition of the present invention, the at least one type of dye other than the black dye is preferably a dye selected from the group consisting of yellow dyes and magenta dyes.

With the black water-based ink composition of the present invention, it is preferable for at least a yellow dye and a magenta dye to be included as the dye other than the black dye.

When the black water-based ink composition of the present invention contains a yellow dye, it is preferable for the yellow dye to be at least one type selected from the group consisting of compounds expressed by the following formula (3):

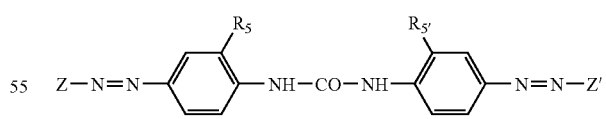

(3)

and the following formula (4):

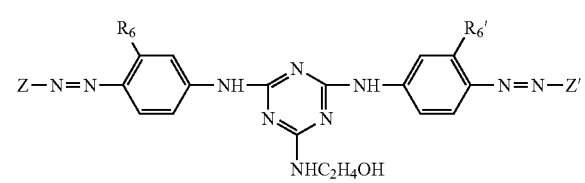

(4)

(in the formulas (3) and (4), $R_5$, $R_5'$, $R_6$, and $R_6'$ are independently a $CH_3$ or $OCH_3$, Z and Z' independently have one of the structures expressed by the following formulas, and may be the same or different from each other:

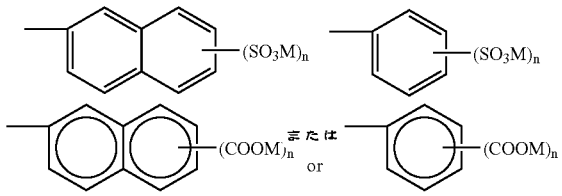

(where M is independently H, Li, Na, or K, and n is an integer of 1 or 2)).

When the black water-based ink composition of the present invention contains a magenta dye, it is preferable for the magenta dye to be at least one type selected from the group consisting of compounds expressed by the following formula (5) and alkali metal salts thereof:

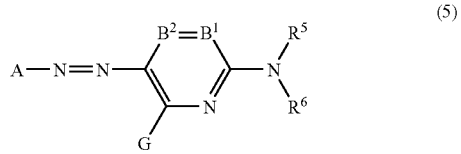

(in the formula (5), A is a residue of a 5-member heterocyclic diazo component $A-NH_2$; $B^1$ and $B^2$ are respectively $-CR^1=$ and $-CR^2=$, or one is a nitrogen atom and the other is $-CR^1=$ or $-CR^2=$; $R^5$ and $R^6$ are each independently a hydrogen atom, aliphatic group, aromatic group, heterocyclic group, acyl group, alkoxycarbonyl group, aryloxycarbonyl group, carbamoyl group, alkylsulfonyl group, arylsulfonyl group, or sulfamoyl group, and each group may have a substituent; G, $R^1$, and $R^2$ are each independently a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, an amino group substituted with an alkyl group, an aryl group, or a heterocyclic group, acylamino group, ureido group, sulfamoylamino group, alkoxycarbonylamino group, aryloxycarbonylamino group, alkyl- or arylsulfonylamino group, nitro group, alkyl- or arylthio group, alkyl- or arylsulfonyl group, alkyl- or arylsulfinyl group, sulfamoyl group, sulfo group, or heterocyclic thio group, and each group may have a substituent; and $R^1$ and $R^5$, and $R^5$ and $R^6$ may bond together to form a 5- or 6-member ring), and C.I. Direct Red 227.

With the black water-based ink composition of the present invention, it is preferable for the compounds expressed by the formula (5) and alkali metal salts thereof to be compounds expressed by the following formula (6) and alkali metal salts thereof:

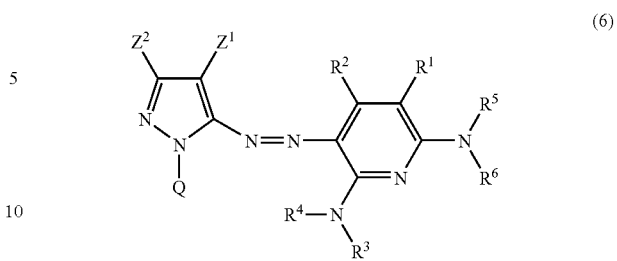

(in the formula (6), $Z^1$ is an electron withdrawing group with a Hammett's substituent constant $\sigma_p$ value of at least 0.20; $Z^2$ is a hydrogen atom, aliphatic group, aromatic group, or heterocyclic group; $R^1$, $R^2$, $R^5$, and $R^6$ are defined the same as for the formula (5); $R^3$ and $R^4$ are each independently a hydrogen atom, aliphatic group, aromatic group, heterocyclic group, acyl group, alkoxycarbonyl group, aryloxycarbonyl group, carbamoyl group, sulfonyl group, or sulfamoyl group; Q is a hydrogen atom, aliphatic group, aromatic group, or heterocyclic group; and each of the above groups $Z^1$, $Z^2$, $R^1$ to $R^6$ and Q may have a substituent).

When the black water-based ink composition of the present invention contains a yellow dye and a magenta dye, it is preferable for the yellow dye to be at least one type selected from the group consisting of compounds expressed by the formula (3) and compounds expressed by the formula (4), and for the magenta dye to be at least one type selected from the group consisting of compounds expressed by the formula (5) and alkali metal salts thereof, compounds expressed by the formula (6) and alkali metal salts thereof, and C.I. Direct Red 227.

With the black water-based ink composition of the present invention, it is preferable for the black dye to be contained in an amount of 0.5 to 12.0 wt % with respect to the total weight of the black water-based ink composition.

When the black water-based ink composition of the present invention contains a yellow dye, it is preferable for the yellow dye to be contained in an amount of 0.03 to 3.0 wt % with respect to the total weight of the black water-based ink composition.

When the black water-based ink composition of the present invention contains a magenta dye, it is preferable for the magenta dye to be contained in an amount of 0.02 to 3.0 wt % with respect to the total weight of the black water-based ink composition.

When the black water-based ink composition of the present invention contains a yellow dye, it is preferable for the black dye and the yellow dye to be contained in a weight ratio between 15:1 and 10:3.

When the black water-based ink composition of the present invention contains a magenta dye, it is preferable for the black dye and the magenta dye to be contained in a weight ratio between 25:1 and 10:3.

The inkjet recording method of the present invention is such that the above-mentioned black water-based ink composition is discharged in the form of droplets from a narrow nozzle, and these droplets are made to adhere to a recording medium.

The recorded material of the present invention is printed by the above-mentioned inkjet recording method.

When a black water-based ink composition is made to contain a black dye having the specific chemical structure shown in this Specification, and another dye for adjusting the hue of this black dye, the hue of the black water-based ink composition can be adjusted as desired. Further, when a dye that is a compound which has no primary amino group in its chemical structure, and furthermore is not an ammonium salt or a salt with an organic cation, is used as the other dye for adjusting hue, this dye improves the storage stability of the black water-based ink composition. The storage stability of the black water-based ink composition will be particularly good when an alkali metal salt is used as this dye. Furthermore, an image printed using the black water-based ink composition of the present invention will have excellent resistance to ozone and light. The black water-based ink composition of the present invention can be used to particular advantage in an inkjet recording method. The above-mentioned organic cation refers to quaternary ammonium ions and quaternary phosphonium ions.

DESCRIPTION OF THE PREFERRED EMBODIMENTS

The inventors discovered that a black water-based ink composition containing a black dye with the specific chemical structure given in this Specification and another dye for adjusting the hue of this special black dye has excellent hue, and that printed material having images with excellent resistance to light and ozone can be obtained by using this black water-based ink composition. The inventors also discovered that when the dye used to adjust the hue of the special black dye has a primary amino group, or when it is an ammonium salt, or when it is a salt with an organic cation, the resulting black water-based ink composition may have poor storage stability, and discovered on the basis of this that the black water-based ink composition will have better storage stability when the dye used to adjust the hue of the black water-based ink composition does not have a primary amino group and is not an ammonium salt or a salt with an organic cation. It was discovered that the storage stability of the resulting black water-based ink composition will be particularly good when the dye used to adjust the hue of the black water-based ink composition is an alkali metal salt. The present invention was perfected on the basis of these findings.

The black water-based ink composition (hereinafter also referred to as "black ink composition") of the present invention contains at least one type of black dye selected from the group consisting of compounds expressed by the following formula (1) and salts of compounds expressed by the formula (1) (hereinafter collectively referred to as the "dye of the formula (1)"):

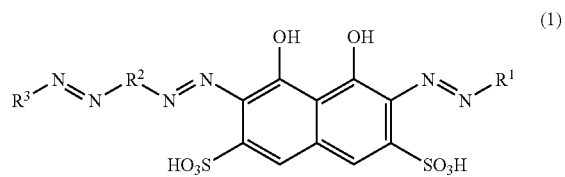

and at least one type of dye other than the dye of the formula (1), which is used to adjust the hue of the dye of the formula (1), in an aqueous medium composed of water or a mixture of water and a water-soluble organic solvent.

In the formula (1) above, $R^1$ is a phenyl group having a substituent or a naphthyl group having a substituent. $R^2$ in the formula (1) is a phenylene group having a substituent or a naphthylene group having a substituent. $R^3$ in the formula (1) is a 5- to 7-member heterocyclic group having a substituent and at least one double bond. The substituents in $R^1$ to $R^3$ are independently selected from the group consisting of OH, $SO_3H$, $PO_3H_2$, $CO_2H$, $NO_2$, $C_1$ to $C_4$ alkyl groups, substituted alkyl groups, $C_1$ to $C_4$ alkoxy groups, substituted alkoxy groups, substituted amino groups, and substituted phenyl groups.

The above-mentioned substituted alkyl group is preferably selected from among $C_1$ to $C_4$ alkyl groups substituted with at least one type of group selected from the group consisting of OH, $SO_3H$, $PO_3H_2$, and $CO_2H$. The above-mentioned substituted alkoxy group is preferably selected from among $C_1$ to $C_4$ alkoxy groups substituted with at least one type of group selected from the group consisting of OH, $SO_3H$, $PO_3H_2$, and $CO_2H$. The above-mentioned substituted amino group is preferably selected from the group consisting of amino groups having one or two $C_1$ to $C_4$ alkyl groups substituted with at least one type of group selected from the group consisting of OH, $SO_3H$, $PO_3H_2$, and $CO_2H$. The above-mentioned substituted phenyl group is preferably selected from the group consisting of phenyl groups having one or two substituents selected from the group consisting of OH, $SO_3H$, $PO_3H_2$, $CO_2H$, $C_1$ to $C_4$ alkyl groups, and substituted $C_1$ to $C_4$ alkyl groups.

It is particularly favorable for the compound expressed by the formula (1) and used in the present invention to be a compound expressed by the following formula (2)

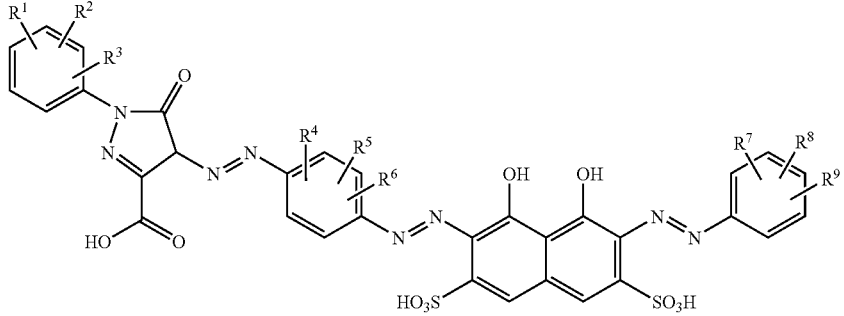

(in the formula (2), $R^1$ to $R^9$ are independently selected from the group consisting of H, OH, $SO_3H$, $PO_3H_2$, $CO_2H$, and $NO_2$).

Compounds expressed by the following formulas (7 to 13) are particularly favorable as the compound expressed by the formula (1) and used in the ink composition of the present invention.
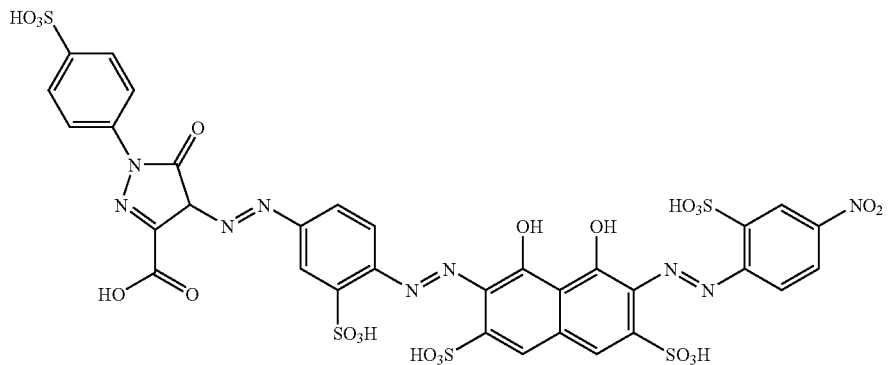
(7)
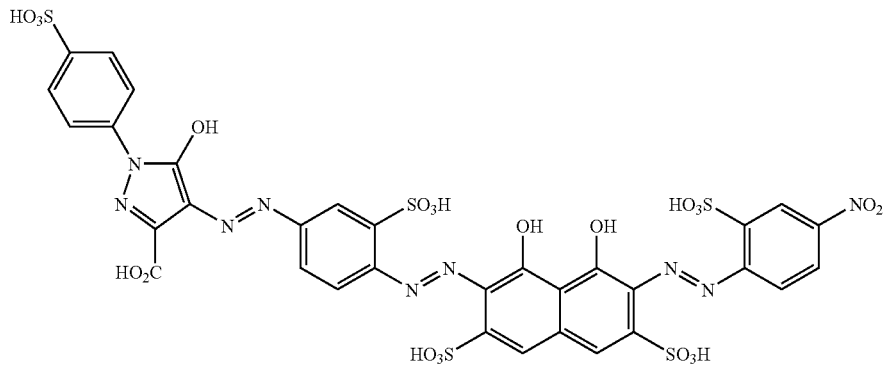
(8)
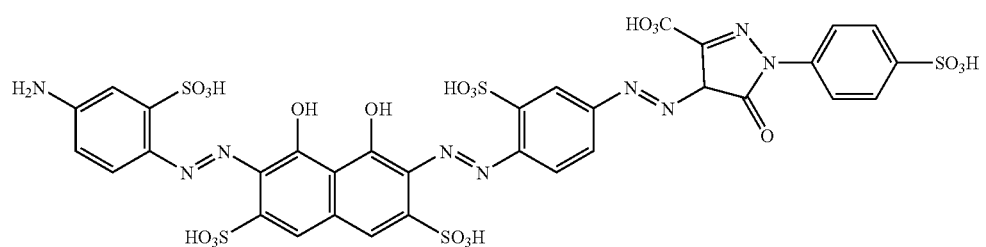
(9)
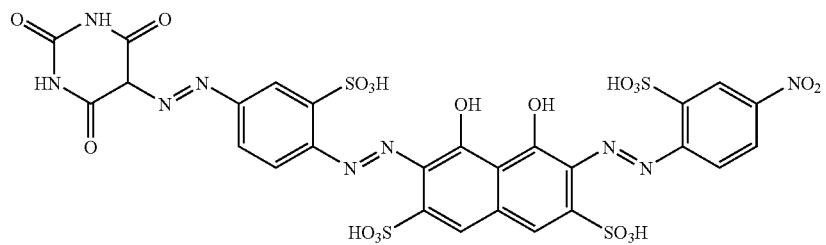
(10)

-continued

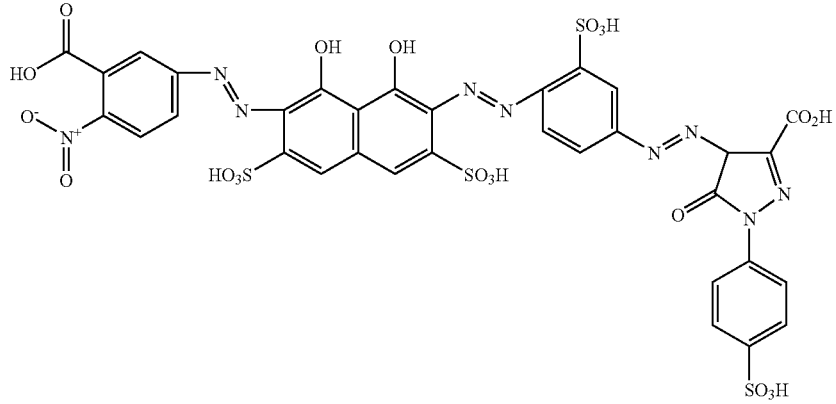
(11)

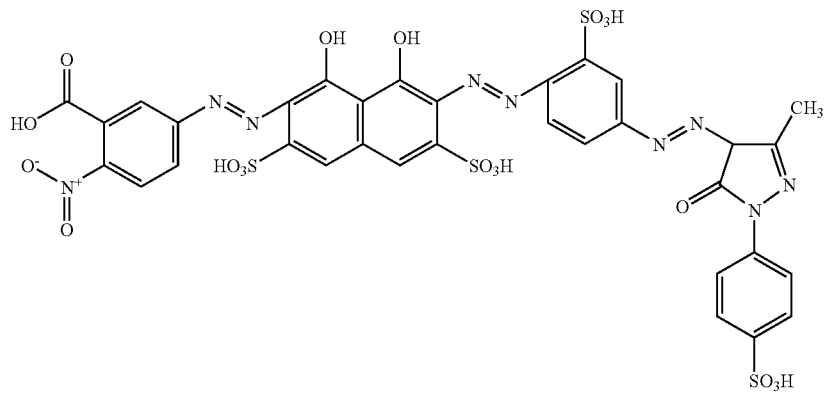
(12)

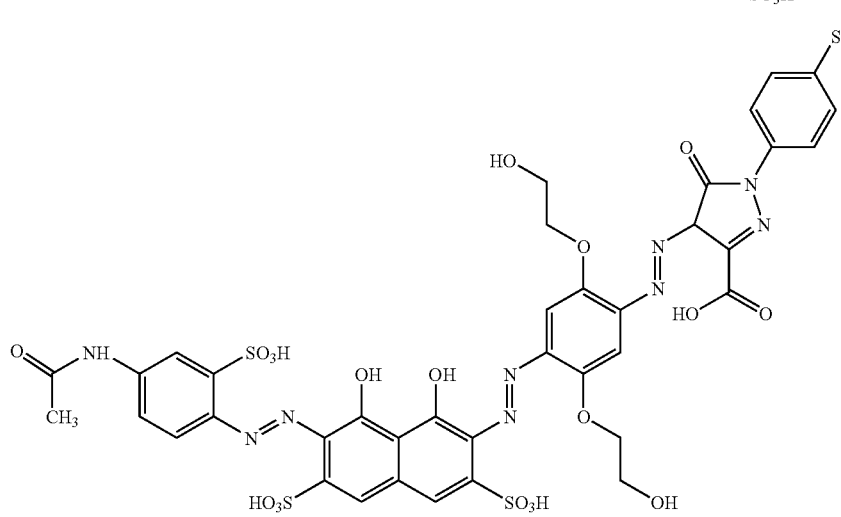
(13)

The compound expressed by the formula (1) or (2) above and used in the ink composition of the present invention can be suitably produced by a favorable method, and for example can be produced by using azo coupling to bond building blocks having four corresponding structures bonded by three azo groups in each compound. Specifically, if we let Q be the dihydroxynaphthalene skeleton portion expressed by the formula (1), for example, then the compound of the formula (1) can be expressed by $R^3$—N=N—$R^2$—N=N—Q—N=N—$R^1$. In a typical, specific example of how this compound is produced, first $R^1$—$NH_2$ is diazotized and the diazonium salt thus obtained is reacted with QH, which gives $R^1$—N=N—QH. $CH_3CON$—$R^2$—$NH_2$ is then diazotized and the compound thus obtained is coupled with the $R^1$—N=N—QH to produce $R^1$—N=N—Q—N=N—$R^2NCOCH_3$. The acetyl group is removed from this compound to create an amino group, after which this is diazotized and then coupled with $R^3H$ to produce $R^1$—N=N—Q—N=N—$R^2$—N=N—$R^3$.

An example of producing the compound expressed by the formula (7) above will now be described as a specific example of the above production.

5-acetylamino-2-aminobenzenesulfonic acid (23.0 g, 0.10 mol) was added to water (300 mL) containing concentrated nitric acid (30 mL). Sodium nitrite (6.9 g) was added over a period of 10 minutes at a temperature of 0 to 5° C. 60 minutes later, the excess nitrous acid was decomposed, and the diazonium salt solution thus obtained was slowly added at 5 to 10° C., while the pH was held between 8 and 9, to 1,8-dihydroxynaphthalene-3,6-disulfonic acid (32.0 g, 0.10 mol) that had been dissolved in water (500 g). It was confirmed by HPLC that this reaction proceeded quantitatively. This yielded a solution (called a dye base) containing a coupled product.

Next, 5-nitro-2-aminobenzenesulfonic acid (43.6 g, 0.20 mol) was added to water (500 g) containing concentrated hydrochloric acid (60 g). Sodium nitrite (13.8 g) was added over a period of 15 minutes at a temperature of 0 to 5° C. 60 minutes later, the diazonium salt solution thus obtained was added at 5 to 10° C., while the pH was held between 6 and 7, over a period of 120 minutes, to the above-mentioned dye base to which tetrahydrofuran (1000 g) had already been added. 5 hours later, the precipitate thus produced was collected and dried in a dryer, which yielded a dark red solid (55.3 g). This dark red solid was dissolved in water (1000 mL) and heated to 80° C. Sodium hydroxide (10 g) was added, and the temperature was held at 80° C. for 8 hours. 8 hours later, concentrated hydrochloric acid was used to adjust the pH to between 7 and 8, and the solution was allowed to cool to room temperature. This solution was dialyzed (less than 50 µS cm$^{-1}$) with Visking™ tubing, after which it was filtered and dried in a dryer, which yielded 47.2 g of black solid.

The black solid obtained above was redissolved in water at a pH of 7 to 9, and lithium hydroxide was used to adjust the pH. Next, sodium nitrite (8.3 g) was added and stirred for 10 minutes. After this, the dye/nitrite solution was transferred into ice water (100 mL) containing concentrated hydrochloric acid (30 g). This was allowed to stand, whereupon the temperature rose to between 15 and 25° C., and the system was left alone for 3 hours. The diazonium salt solution thus obtained was added at 15 to 20° C., while the pH was held between 6 and 7, over a period of 120 minutes to a solution of 1-(4-sulfophenyl)-3-carboxy-5-pyrazolone (17.9 g, 0.06 mol). The pH was maintained by adding lithium hydroxide. Next, this solution was dialyzed (less than 50 µS cm$^{-1}$) with Visking™ tubing, after which it was filtered and dried in a dryer, which yielded a compound expressed by the formula (7) in the form of a black solid.

When the compound expressed by the formula (1) and used in the black ink composition of the present invention has a proton acid group such as OH, SO$_3$H, or PO$_3$H$_2$, it is preferable for the compound expressed by the formula (1) to be an alkali metal salt of that proton acid group, such as a lithium salt, sodium salt, or potassium salt, with a lithium salt or sodium salt being particularly favorable. Using an alkali metal salt of the compound expressed by the formula (1) allows a black ink composition with excellent storage stability to be obtained.

The black ink composition of the present invention can contain just one type of the dye of the formula (1), or can contain two or more types. The dye of the formula (1) used in the black ink composition of the present invention is itself not completely neutral in hue, and generally has a hue tinged with cyan. In the present invention, the hue of the dye of the formula (1) is adjusted by adding at least one type of dye other than the dye of the formula (1) to the black ink composition. In general, it is preferable for the hue of the black ink composition to be neutral, so it is particularly favorable to adjust to a neutral hue, but the hue can also be adjusted to something other than neutral as desired. In the present invention, the black ink composition is adjusted to the desired hue by adding at least one type of dye with a different hue from that of the dye of the formula (1) to the black ink composition. This dye with a different hue from that of the dye of the formula (1) is preferably a compound that has at least one type of group (hereinafter referred to as "special hydrophilic group") selected from the group consisting of sulfo groups (—SO$_3$H groups), carboxyl groups (—CO$_2$H groups), and alkali metal salts of these groups (—SO$_3$M groups and —CO$_2$M groups, where M is an alkali metal atom), that has no primary amino group, and that is neither an ammonium salt nor a salt of an organic cation. A black ink composition obtained using a dye such as this will have better storage stability. Another effect of this dye is that it can be easily dissolved in an aqueous solvent because it has at least one type of group selected from the group consisting of sulfo groups, carboxyl groups, and alkali metal salts of these.

The dye other than the dye of the formula (1) is a dye having a hue that is different from that of the dye of the formula (1), examples of which include one or more types selected from among black dyes, yellow dyes, magenta dyes, and cyan dyes. The black ink composition can be adjusted to the desired hue by suitably selecting a dye other than the dye of the formula (1) and adding it to the black ink composition. In this case, two or more types of dye having a different hue from that of the dye of the formula (1) can be used together to adjust the hue of the black ink composition. Since the dye of the formula (1) generally is tinged with cyan, in order to adjust the black ink composition to a neutral hue, it is preferable to add at least one type of dye selected from the group consisting of yellow dyes and magenta dyes to the black ink composition, and it is particularly favorable to add at least one type of yellow dye and at least one type of magenta dye to the black ink composition.

The following is a description of yellow dyes and magenta dyes that are favorable as the dyes added to the black ink composition in order to adjust the hue of the black ink composition of the present invention.

There are no particular restrictions on the above-mentioned yellow dye used in the present invention, but one that has the above-mentioned special hydrophilic group is preferred because it will yield an ink composition with better storage stability. Further, the use of a yellow dye that has no primary amino group, and is neither an ammonium salt nor a salt of an organic cation is preferred because the resulting black ink composition will have better storage stability. Of these, it is particularly favorable to use at least one type of yellow dye selected from the group consisting of compounds expressed by the following formula (3):

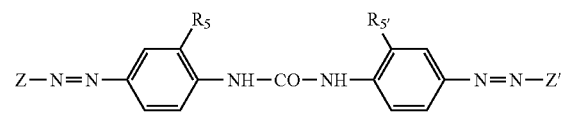

(3)

and the following formula (4):

(4)

because the black ink composition will have superior resistance to light and ozone.

In the formulas (3) and (4), R$_5$, R$_5$', R$_6$, and R$^{6'}$ are independently a CH$_3$ or OCH$_3$, Z and Z' independently have one of the structures expressed by the following formulas, and may be the same or different from each other:

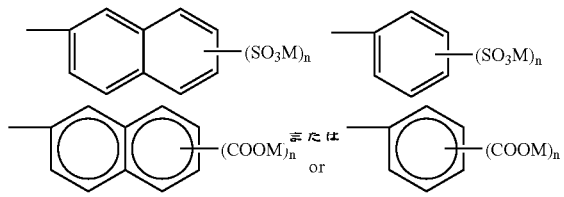

Here, M is independently H, Li, Na, or K, and n is an integer of 1 or 2. C.I. Direct Yellow 86 is particularly favorable as the yellow dye used in the present invention.

When a yellow dye is added to the black ink composition of the present invention, it can either be at least one type selected from the group consisting of compounds expressed by the above the formulas (3) and (4), or, as long as the effect of the present invention is not compromised, or used together with another yellow dye.

The magenta dye used in the present invention will now be described. When a magenta dye is added to the black ink composition of the present invention, there are no particular restrictions on the chemical structure of the magenta dye. However, a magenta dye having the above-mentioned special hydrophilic group is preferred because of its good solubility in aqueous solvents. Further, using a magenta dye that has no primary amino group and is neither an ammonium salt nor a salt of an organic cation is preferred in the present invention because the resulting black ink composition will have better storage stability. In particular, because the black ink composition will have superior resistance to light and ozone, it is preferable in the present invention to use at least one type of magenta dye selected from the group consisting of compounds expressed by the following formula (5) and alkali metal salts thereof (hereinafter collectively referred to as the "dye of the formula (5)"):

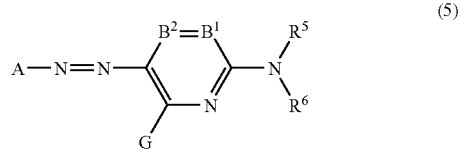

(5)

and C.I. Direct Red 227. A lithium salt, sodium salt, or potassium salt is particularly favorable as the alkali metal salt of a compound expressed by the formula (5), because the resulting black ink composition will have superior storage stability.

In the formula (5), A is a residue of a 5-member heterocyclic diazo component A-NH$_2$. B$^1$ and B$^2$ are respectively —CR$^1$= and —CR$^3$=, or one is a nitrogen atom and the other is —CR$^1$= or —CR$^2$=. R$^5$ and R$^6$ are each independently a hydrogen atom, alkyl group, alkenyl group, alkynyl group, aralkyl group, aryl group, heterocyclic group, acyl group, alkoxycarbonyl group, aryloxycarbonyl group, carbamoyl group, alkylsulfonyl group, arylsulfonyl group, or sulfamoyl group, and each group may have a substituent. G, R$^1$, and R$^2$ are each independently a hydrogen atom, halogen atom, alkyl group, alkenyl group, alkynyl group, aralkyl group, aryl group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, an amino group substituted with an alkyl group, an aryl group, or a heterocyclic group, acylamino group, ureido group, sulfamoylamino group, alkoxycarbonylamino group, aryloxycarbonylamino group, alkyl- or arylsulfonylamino group, nitro group, alkyl- or arylthio group, alkyl- or arylsulfonyl group, alkyl- or arylsulfinyl group, sulfamoyl group, sulfo group, or heterocyclic thio group, and each group may have a substituent. R$^1$ and R$^5$, and R$^5$ and R$^6$ may bond together to form a 5- or 6-member ring.

Further, it is preferable for the compound expressed by the formula (5) to be a compound expressed by the following formula (6):

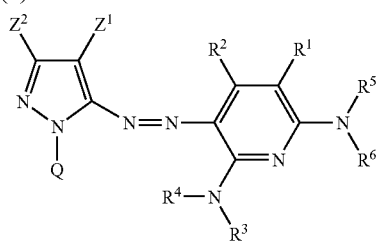

(6)

In the formula (6), Z$^1$ is an electron withdrawing group with a Hammett's substituent constant $\sigma_p$ value of at least 0.20. Z$^2$ is a hydrogen atom, alkyl group, alkenyl group, alkynyl group, aralkyl group, aryl group, or heterocyclic group. R$^1$, R$^2$, R$^5$, and R$^6$ are defined the same as for the formula (5). R$^3$ and R$^4$ are each independently a hydrogen atom, alkyl group, alkenyl group, alkynyl group, aralkyl group, aryl group, heterocyclic group, acyl group, alkoxycarbonyl group, aryloxycarbonyl group, carbamoyl group, sulfonyl group, or sulfamoyl group. Q is a hydrogen atom, alkyl group, alkenyl group, alkynyl group, aralkyl group, aryl group, or heterocyclic group. Each of the above groups Z$^1$, Z$^2$, R$^1$ to R$^6$, and Q may also have a substituent.

The compounds expressed by the formula (5) above will now be described in further detail.

In the formula (5), A is a residue of a 5-member heterocyclic diazo component A-NH$_2$. Examples of the hetero atom of this 5-member heterocycle include N, O, and S. A nitrogen-containing 5-member heterocycle is preferred, and the heterocycle may be condensed with an aliphatic ring, an aromatic ring, or another heterocycle. Preferred examples of the heterocycle of A include a pyrazole ring, imidazole ring, thiazole ring, isothiazole ring, thiadiazole ring, benzothiazole ring, benzoxazole ring, and benzoisothiazole ring. Each of these heterocyclic groups may also have a substituent. Of these, the pyrazole ring, imidazole ring, isothiazole ring, thiadiazole ring, and benzothiazole ring expressed by the following general formulas (a to f) are preferred.

General Formula (a)

(a)

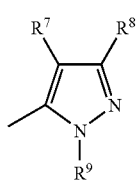

(b)

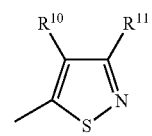

-continued

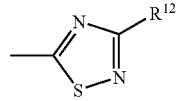
(c)

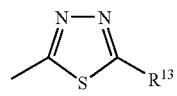
(d)

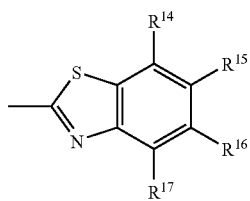
(e)

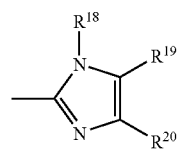
(f)

$R^7$ to $R^{20}$ in general formulas a to f above represent the same substituents as the substituents for G, $R^1$, and $R^2$ discussed below. Of the above general formulas a to f, the pyrazole ring and isothiazole ring expressed by general formulas a and b are preferable, with the pyrazole ring expressed by general formula a being best of all.

$B^1$ and $B^2$ are respectively —$CR^1$= and —$CR^3$=, or one is a nitrogen atom and the other is —$CR^1$= or —$CR^2$=, but preferably expressed —$CR^1$= and —$CR^3$=, respectively.

$R^5$ and $R^6$ are each independently a hydrogen atom, alkyl group, alkenyl group, alkynyl group, aralkyl group, aryl group, heterocyclic group, acyl group, alkoxycarbonyl group, aryloxycarbonyl group, carbamoyl group, alkyl- or arylsulfonyl group, or sulfamoyl group, and each group may have a substituent. Examples of preferred substituents expressed by $R^5$ and $R^6$ include a hydrogen atom, alkyl group, alkenyl group, alkynyl group, aralkyl group, aryl group, heterocyclic group, acyl group, and alkyl- and arylsulfonyl groups. Even more preferable are a hydrogen atom, aryl group, heterocyclic group, acyl group, or alkyl- or arylsulfonyl group. Most preferable are a hydrogen atom, aryl group, and heterocyclic group. Each group may also have a substituent. $R^5$ and $R^6$ cannot both be a hydrogen atom, however.

G, $R^1$, and $R^2$ are each independently a hydrogen atom, halogen atom, alkyl group, alkenyl group, alkynyl group, aralkyl group, aryl group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxygroup, carbamoyloxy group, heterocyclic oxy group, alkoxycarbonyloxy group, aryloxycarbonyloxy group, an amino group substituted with an alkyl group, an aryl group, or a hetero- cyclic group, acylamino group, ureido group, sulfamoylamino group, alkoxycarbonylamino group, aryloxycarbonylamino group, alkyl- or arylsulfonylamino group, nitro group, alkyl- or arylthio group, alkyl- or arylsulfonyl group, alkylsulfinyl group, arylsulfinyl group, sulfamoyl group, or sulfo group, and each group may have a substituent.

Preferable examples of the substituent expressed by G include a hydrogen atom, halogen atom, alkyl group, alkenyl group, alkynyl group, aralkyl group, aryl group, hydroxy group, alkoxy group, aryloxy group, acyloxygroup, heterocyclic oxy group, an amino group substituted with an alkyl group, an aryl group, or a heterocyclic group, acylamino group, ureido group, sulfamoylamino group, alkoxycarbonylamino group, aryloxycarbonylamino group, alkyl- or arylthio group, and heterocyclic thio group. Even more preferable are a hydrogen atom, halogen atom, alkyl group, alkenyl group, hydroxy group, alkoxy group, aryloxy group, acyloxygroup, an amino group substituted with an alkyl group, an aryl group, or a heterocyclic group, or acylamino group. Of these, a hydrogen atom, arylamino group, or amide group is most preferable. Each group may also have a substituent.

Preferred examples of substituents expressed by $R^1$ and $R^2$ include a hydrogen atom, alkyl group, alkoxycarbonyl group, carboxyl group, carbamoyl group, and cyano group. Each group may also have a substituent. $R^1$ and $R^5$, or $R^2$ and $R^6$ may bond together to form a 5- or 6-member ring. If the substituents expressed by A, $R^1$, $R^2$, $R^5$, $R^6$, and G also have substituents of their own, examples of such substituents include those listed above for G, $R^1$, and $R^2$.

The magenta dye expressed by the formula (5) further has an ionic hydrophilic group as a substituent at some position on A, $R^1$, $R^2$, $R^5$, $R^6$, or G. The ionic hydrophilic group used as this substituent is a group selected from the group consisting of sulfo groups (—$SO_3H$ groups), carboxyl groups (—$CO_2H$ groups), and —$SO_3M$ groups and —$CO_2M$ groups (where M is an alkali metal atom). This ionic hydrophilic group is preferably a carboxyl group or sulfo group, with a sulfo group being particularly favorable. It is particularly favorable for the alkali metal atom expressed by M to be selected from among lithium, sodium, and potassium. When a magenta dye is used in which M is not ammonium or an organic cation, and is an alkali metal atom, the resulting black ink composition will have particularly good storage stability.

When the black ink composition of the present invention is used, of the magenta dyes expressed by the formula (5) above, it is particularly favorable to use one expressed by the formula (6). In the formula (6), $Z^1$ is an electron withdrawing group with a Hammett's substituent constant $\sigma_p$ value of at least 0.20. It is preferable for $Z^1$ to be an electron withdrawing group with a $\sigma_p$ value of from 0.30 to 1.0. Preferred, specific substituents include the electron withdrawing substituents discussed below, but of these, a $C_2$ to $C_{12}$ acyl group, $C_2$ to $C_{12}$ alkyloxycarbonyl group, nitro group, cyano group, $C_1$ to $C_{12}$ carbamoyl group, and $C_1$ to $C_{12}$ haloalkyl group are preferable. A cyano group, $C_1$ to $C_{12}$ alkylsulfonyl group, or $C_6$ to $C_{18}$ arylsulfonyl group is particularly favorable, and a cyano group is most preferred.

$R^1$, $R^2$, $R^5$, and $R^6$ in the formula (6) are the same as for the formula (5) above. $R^3$ and $R^4$ are each independently a hydrogen atom, alkyl group, alkenyl group, alkynyl group, aralkyl group, aryl group, heterocyclic group, acyl group, alkoxycarbonyl group, aryloxycarbonyl group, carbamoyl group, alkyl- or arylsulfonyl group, or sulfamoyl group. Of these, a hydrogen atom, aryl group, heterocyclic group, acyl group, or alkyl- or arylsulfonyl group is preferred, and a hydrogen atom, aryl group, or heterocyclic group is particularly favorable. $Z^2$ is a hydrogen atom, alkyl group, alkenyl group, alkynyl group, aralkyl group, aryl group, or heterocyclic group.

In the formula (6), Q is a hydrogen atom, alkyl group, alkenyl group, alkynyl group, aralkyl group, aryl group, or heterocyclic group. Of these, it is preferable for Q to be a group composed of a non-metal atom group required to form a 5- to 8-member ring. This 5- to 8-member ring may be substituted, it may be a saturated ring, or it may have unsaturated bonds. Of these, an aryl group and a heterocyclic group are particularly favorable. Examples of favorable non-metal atoms include a nitrogen atom, oxygen atom, sulfur atom, and carbon atom. Specific examples of 5- to 8-member rings include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzooxazole ring, thiazole ring, benzothiazole ring, oxane ring, sulfolane ring, and thiane ring.

Each of the groups described above may also have a substituent. If they do have a substituent, examples thereof include the substituents listed for the formula (5), the groups listed for G, $R^1$, and $R^2$, and ionic hydrophilic groups.

Examples of electron withdrawing groups with a Hammett's substituent constant $\sigma_p$ value of at least 0.60 include a cyano group, nitro group, alkylsulfonyl group (such as a methanesulfonyl group), and arylsulfonyl group (such as a benzenesulfonyl group). Examples of electron withdrawing groups with a Hammett's $\sigma_p$ value of at least 0.45 include, in addition to the above, an acyl group (such as acetyl), alkoxycarbonyl group (such as dodecyloxycarbonyl), aryloxycarbonyl group (such as m-chlorophenoxy-carbonyl), alkylsulfinyl group (such as n-propylsulfinyl), arylsulfinyl group (such as phenylsulfinyl), sulfamoyl group (such as N-ethylsulfamoyl or N,N-dimethylsulfinyl), and haloalkyl group (such as trifluoromethyl).

Examples of electron withdrawing groups with a Hammett's substituent constant $\sigma_p$ value of at least 0.30 include, in addition to the above, an acyloxy-group (such as acetoxy), carbamoyl group (such as N-ethylcarbamoyl or N,N-dibutylcarbamoyl), haloalkoxy group (such as trifluoromethyloxy), haloaryloxy group (such as pentafluorophenyloxy), sulfonyloxy group (such as methylsulfonyloxy), haloalkylthio group (such as difluoromethylthio), aryl groups substituted with two or more electron withdrawing groups with a $\sigma_p$ value of at least 0.15 (such as 2,4-dinitrophenyl or pentachlorophenyl), and heterocycles (such as 2-benzooxazolyl, 2-benzothiazolyl, and 1-phenyl-2-benzimidazolyl). Specific examples of electron withdrawing groups with a $\sigma_p$ value of at least 0.20 include, in addition to the above, halogen atoms.

The following are particularly favorable combinations of the magenta dye expressed by the formula (5).

(A) $R^1$ and $R^2$ are preferably a hydrogen atom, alkyl group, aryl group, heterocyclic group, sulfonyl group, or acyl group, and even more preferably a hydrogen atom, aryl group, heterocyclic group, or sulfonyl group, and most preferably a hydrogen atom, aryl group, or heterocyclic group. $R^1$ and $R^2$ cannot both be a hydrogen atom, however.

(B) G is a hydrogen atom, halogen atom, alkyl group, hydroxy group, amino group (but not a primary amino group), or amide group, and even more preferably a hydrogen atom, halogen atom, or amino group (but not a primary amino group), and most preferably a hydrogen atom or amino group (but not a primary amino group).

(C) A is preferably a pyrazole ring, imidazole ring, isothiazole ring, thiadiazole ring, or benzothiazole ring, and more preferably a pyrazole ring or isothiazole ring, and most preferably a pyrazole ring.

(D) $B^1$ and $B^2$ are respectively —$CR^1$= and —$CR^3$=, and $R^1$ and $R^2$ here are each preferably a hydrogen atom, halogen atom, cyano group, carbamoyl group, carboxyl group, alkyl group, hydroxy group, or alkoxy group, and even more preferably a hydrogen atom, cyano group, carbamoyl group, or alkyl group.

As to combinations of favorable substituents of the compound expressed by the formula (5), a preferred compound is one in which at least one of the various substituents is one of the above-mentioned preferable groups, and in a preferable compound, more of the various substituents are the above-mentioned preferable groups, while the most preferable compound is one in which all of the substituents are the above-mentioned preferable groups.

The compound expressed by the formula (5) can be manufactured by any method, but can be manufactured by the following method, for example.

(a) A compound expressed by the following formula (14) is reacted with a diazotization agent to form a diazonium salt.

(b) The diazonium salt formed in step (a) is reacted with a coupling agent expressed by the following formula (15) to form a compound expressed by the formula (5) above.

(c) The compound formed in step (b) is reacted with an alkylation agent, arylation agent, or heterylation agent in the presence of a base to form a compound expressed by the formula (5) in which a substituent such as an alkyl group has been introduced.

General formula (14)

General formula (15)

(14)

A—NH$_2$

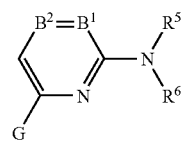

(15)

(A, G, $B^1$, $B^2$, $R^5$, and $R^6$ in the formulas (14) and (15) are defined the same as for the formula (5) above.)

Further, when a water-soluble group is introduced in the compound of the formula (5), an electrophilic reaction is used. Electrophilic reactions include sulfonation, a Mannich reaction, and a Friedel-Crafts reaction, among which sulfonation is preferred.

The following are specific examples of compounds expressed by the formula (5) that can be used favorably in the present invention.

| 染料 | R₁ | R₂ |
|---|---|---|
| 1 | 2-methylbenzothiazole-6-SO₃Na | 2-methylbenzothiazole-6-SO₃Na |
| 2 | 2-methylbenzothiazole-6-SO₂NH-(3,5-di-COOK-phenyl) | 2-methylbenzothiazole |
| 3 | 2-methylbenzothiazole-6-SO₃Li | 2-methylbenzothiazole-6-SO₃Li |
| 4 | 2-methylbenzothiazole-6-SO₃Na | 2-methylbenzothiazole-6-SO₃Na |

| 染料 | R₃ | R₄ |
|---|---|---|
| 1 | 2,3,4,6-tetramethylphenyl-5-SO₃Na | 2,3,4,6-tetramethylphenyl-5-SO₃Na |
| 2 | 2,3,4,6-tetramethylphenyl-5-SO₃K | 2,3,4,6-tetramethylphenyl-5-SO₃K |
| 3 | 3,4,5-trimethylphenyl-SO₃Li | 3,4,5-trimethylphenyl-SO₃Li |

-continued
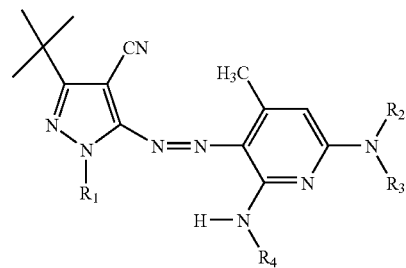
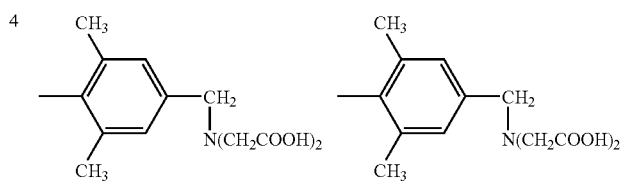
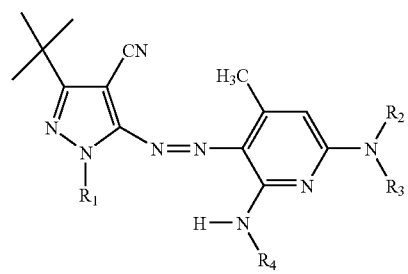
| 色素 | R₁ | R₂ | R₃ | R₄ |
|---|---|---|---|---|
| 5 | 2-benzothiazolyl | 2-benzothiazolyl | 2,3,5-trimethyl-6-SO₃K-phenyl | 2,3,5-trimethyl-6-SO₃K-phenyl |
| 6 | 2-(6-SO₃K-benzothiazolyl) | 2-benzothiazolyl | 2,3,5-trimethyl-6-SO₃K-phenyl | 2,3,5-trimethyl-6-SO₃K-phenyl |
| 7 | 2-(6-methyl-benzothiazolyl) | 2-(6-SO₃K-benzothiazolyl) | 2,3,5-trimethyl-6-SO₃K-phenyl | 2,3,5-trimethyl-6-SO₃K-phenyl |

Colorant
[Twenty-Eighth Chemical Formula]
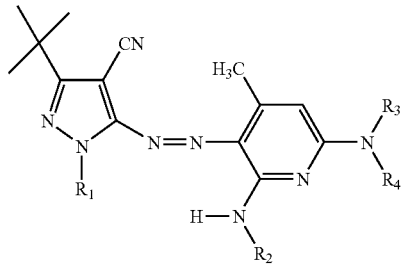
| 色素 | R₁ | R₂ | R₃ | R₄ |
|---|---|---|---|---|
| 8 | 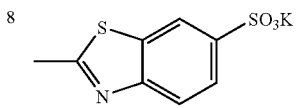 | 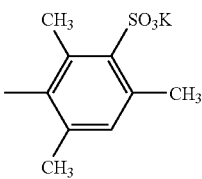 | 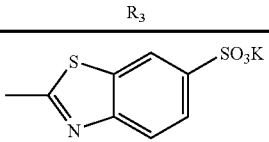 | 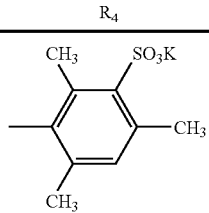 |
| 9 | 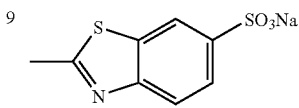 | 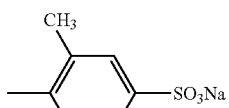 | 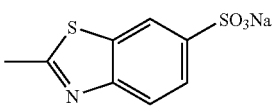 | 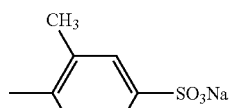 |
| 10 | 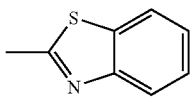 | 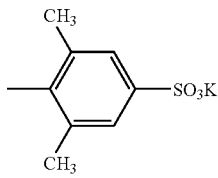 | 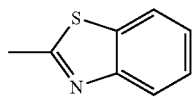 | 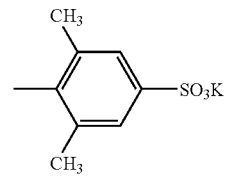 |
| 11 | 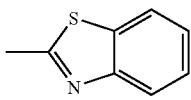 | 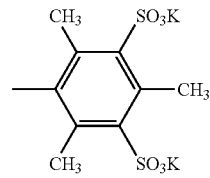 | 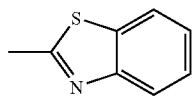 | 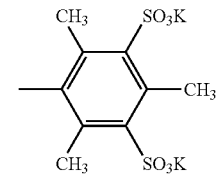 |
| 12 | 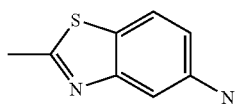 | 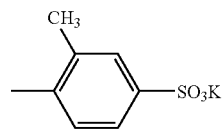 | 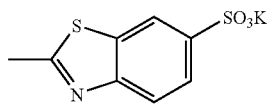 | 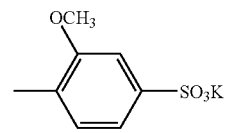 |

Colorant
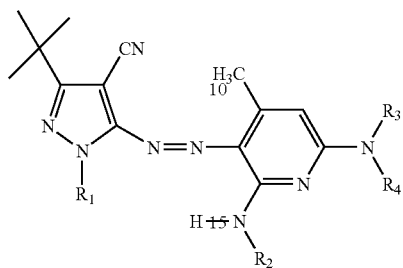
| 染料 | R₁ | R₂ | R₃ | R₄ |
|---|---|---|---|---|
| 13 | 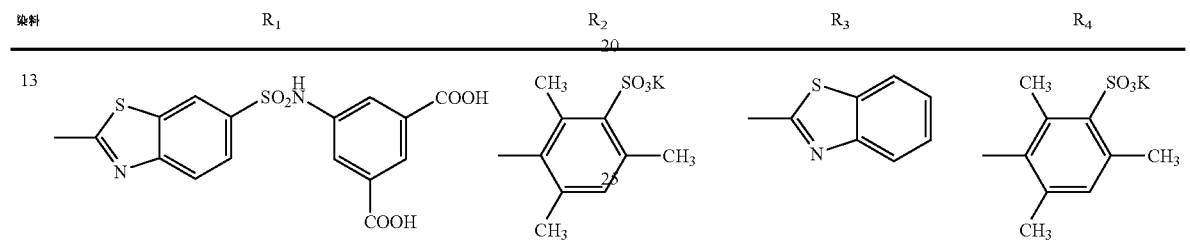 | | | |
| 14 | 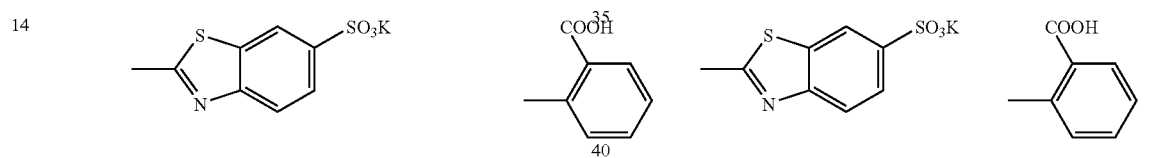 | | | |
| 15 | 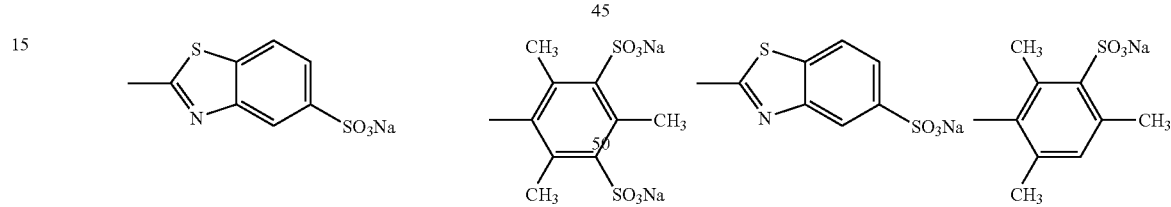 | | | |
| 16 | 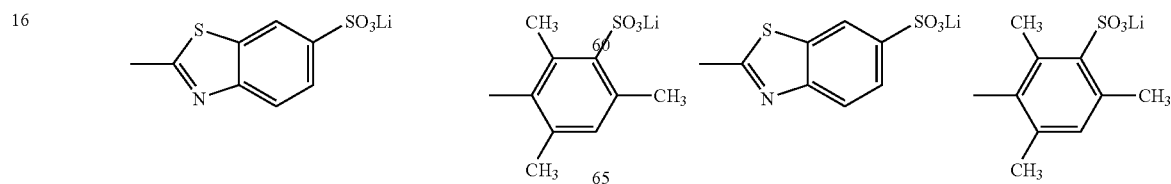 | | | |

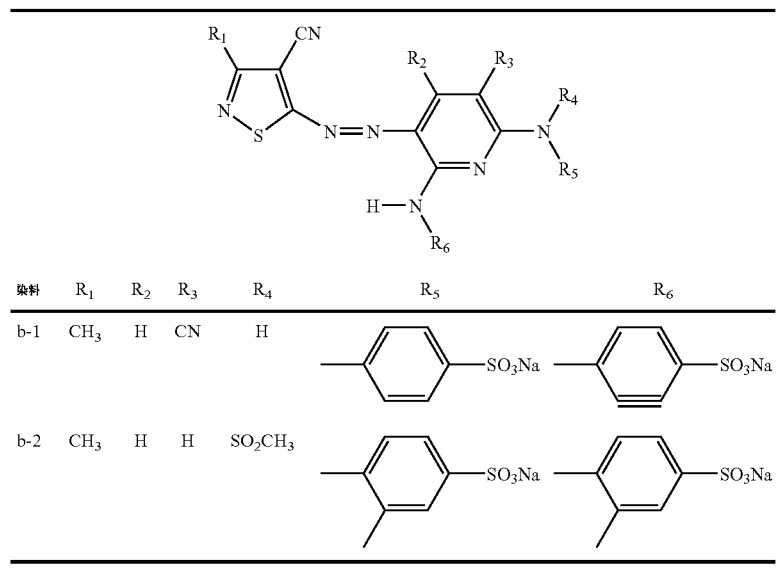

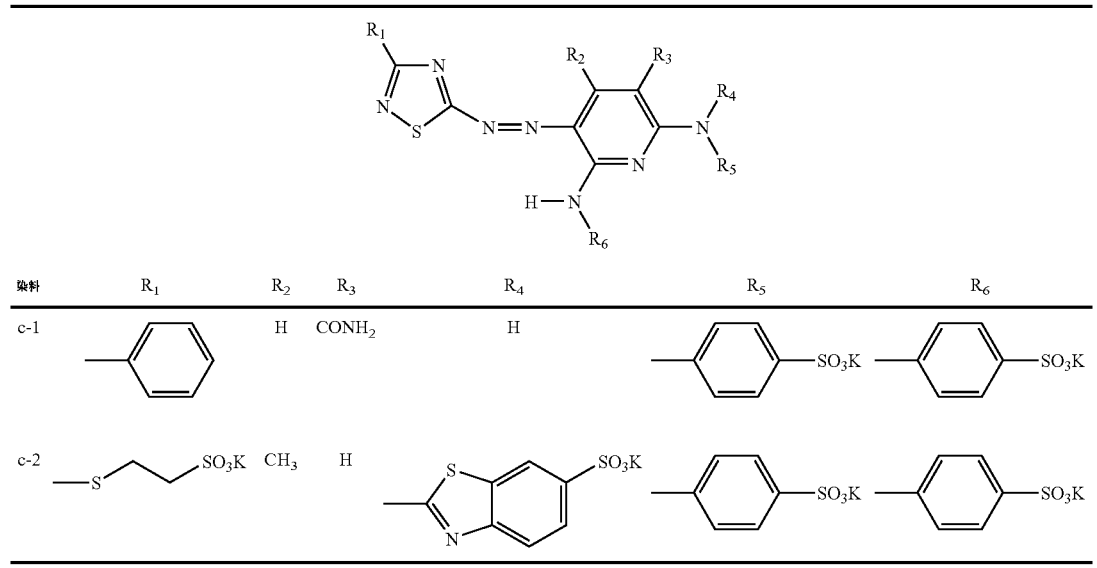

In addition, other magenta dyes can be used together with the above-mentioned dyes of the formula (5) in the black ink composition of the present invention, as long as the effect of the present invention is not compromised. An example of a magenta dye that can be used concurrently is expressed by the following formula (16).

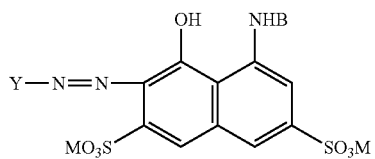

(In the formula (16), Y is a $C_1$ to $C_4$ alkyl group, alkoxy group, naphthyl group, or a phenyl group substituted with OH, $SO_3H$, or COOM. B stands for the following formula:

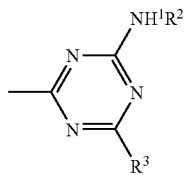

(where $R^1$ is a $C_1$ to $C_4$ alkyl group substituted with H, OH, or COOH, $R^2$ is a $C_1$ to $C_4$ alkyl group substituted with H, OH, $OCH_3$, $OC_2H_3$, $SO_3M$, or COOM, and each M is independently H, Li, Na, or K).)

Therefore, in order to adjust the hue of the black ink composition of the present invention, when the black ink composition contains at least one type of yellow dye and at least one type of magenta dye along with the dye of the formula (1), it is preferable to use at least one type of yellow dye selected from the group consisting of compounds expressed by the formula (3) and compounds expressed by the formula (4), and to use at least one type of magenta dye selected from the group consisting of the dye of the formula (5) and C.I. Direct Red 227. The dye of the formula (6) is preferable as the dye of the formula (5).

The amount in which the dye is contained in the black ink composition of the present invention will now be described. The black ink composition of the present invention includes at least one type of the dye of the formula (1) as a black dye, and, in order to adjust the hue, at least one type of dye other than the dye of the formula (1). In this case, the type and amount of the dye other than the dye of the formula (1) contained in the black ink composition of the present invention can be suitably determined such that the black ink composition can be adjusted to the desired hue. It is generally preferable, though, to use dyes in the amounts given below.

At least one type of the dye of the formula (1) is contained as a black dye in the black ink composition of the present invention, and it is preferable for the total amount of the dye of the formula (1) to be from 0.5 to 12.0 wt %, and even more preferably from 1.0 to 10.0 wt %, with respect to the total weight of the black ink composition. If the total amount of the dye of the formula (1) contained in the black ink composition is at least 0.5 wt %, color expression will be good enough and high image density will be obtained when this ink composition is used to record images or the like on a recording medium. Also, by adjusting the content of the dye of the formula (1) in the black ink composition to 12.0 wt % or less, the ink composition can be adjusted to a favorable viscosity, the amount of ink composition discharged from an inkjet head can be stabilized, and clogging of the inkjet head can be prevented.

When a yellow dye is contained in the black ink composition of the present invention, it is preferably contained in an amount of 0.03 to 3.0 wt %, and even more preferably 0.1 to 2.5 wt %, with respect to the total weight of the black ink composition. When at least one compound selected from the group consisting of compounds expressed by the formula (3) (hereinafter referred to as the "dye of the formula (3)") and compounds expressed by the formula (4) (hereinafter referred to as the "dye of the formula (4)") is used as the yellow dye, it is preferable for the combined amounts of the dye of the formula (3) and the dye of the formula (4) contained in the black ink composition to be 0.03 to 3.0, and even more preferably, 0.1 to 2.5 wt %, with respect to the total weight of the black ink composition. If the total amount of yellow dye contained in the black ink composition, or the total amount of the dye of the formula (3) and the dye of the formula (4) contained in the black ink composition is at least 0.03 wt %, the effect will be that the black ink composition can be adjusted to the desired hue, and if this amount is no more than 3.0 wt %, the effect will be that clogging of an inkjet nozzle can be prevented.

When the black ink composition of the present invention contains a magenta dye, it is preferable for the total amount in which the magenta dye is contained to be 0.02 to 3.0 wt % with respect to the total weight of the black ink composition. When at least one compound selected from the group consisting of the dye of the formula (5), the dye of the formula (6), and C.I. Direct Red 227 is used as the magenta dye, it is preferable for these dyes contained in the black ink composition to be contained in a combined amount of 0.02 to 3.0 wt %, and more preferably 0.1 to 2.5 wt %, with respect to the total weight of the black ink composition. If the total amount of magenta dye contained in the black ink composition, or the combined amount of the dye of the formula (3) and the dye of the formula (4) contained in the black ink composition is at least 0.02 wt %, the effect will be that the black ink composition can be adjusted to the desired hue, and if the this amount is no more than 3.0 wt %, the effect will be that clogging of an inkjet nozzle can be prevented.

Further, when at least one type of the dye of the formula (1) is contained as the black dye in the black ink composition of the present invention, and at least one type of dye selected from the group consisting of the dye of the formula (3) and the dye of the formula (4) is contained as a yellow dye, it is preferable in terms of obtaining the desired hue of the black ink composition for the black dye and the yellow dye to be contained in the black ink composition in a weight ratio of from 15:1 to 10:3.

Also, when at least one type of the dye of the formula (1) is contained as the black dye in the black ink composition of the present invention, and at least one type of dye selected from the group consisting of the dye of the formula (5), the dye of the formula (6), and C.I. Direct Red 227 is contained as a magenta dye, it is preferable in terms of obtaining the desired hue of the black ink composition for the black dye and the magenta dye to be contained in the black ink composition in a weight ratio of from 25:1 to 10:3.

The black ink composition of the present invention can be manufactured by dissolving at least one type of the dye of the formula (1) and at least one type of other dye for adjusting the hue, in a solvent including water. Water or a mixture of water and a water-soluble organic solvent is preferred as the solvent used in the ink composition of the present invention. Examples of the water-soluble organic solvent used in the present invention include one or more types selected from the group consisting of dimethylformamide, dimethylacetamide, and other such amides; acetone, diacetone alcohol, and other such ketones and ketone alcohols; tetrahydrofuran, dioxane, and other such ethers; ethylene glycol, propylene glycol, 1,5-pentanediol, triethylene glycol, diethylene glycol, and other such alkylene glycols; glycerol; polyethylene glycol, polypropylene glycol, and other such polyalkylene glycols; methyl alcohol, ethyl alcohol, n-propyl alcohol, n-butyl alcohol, and other such alkyl alcohols; urea; and 2-pyrrolidone, sulfolane, pyrrolidone, N-methyl-2-pyrrolidone, 1,3-dimethyl-2-imidazolinone, and other such polar organic solvents. The water-soluble organic solvent used in the present invention preferably has a lower evaporation pressure than water at normal temperature.

It is particularly favorable for the black ink composition of the present invention to contain a glycol ether-based water-soluble organic solvent, because it will increase the permeation of the ink composition into the recording medium, and because when color printing is performed, there will be less bleeding of the inks at the boundary between the black ink of the present invention and colored inks with which it comes into contact, which affords an extremely sharp image. Examples of favorable glycol ether-based water-soluble organic solvents for use in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether.

When a glycol ether-based water-soluble organic solvent is contained in the black ink composition of the present invention, there are no particular restrictions on the proportion in which this glycol ether-based water-soluble organic solvent is contained in the black ink composition, and a person skilled in the art will be able to suitably select a proportion that will not compromise the effect of the present invention. However, it is preferable for the black ink composition of the present invention to contain the glycol ether-based water-soluble organic solvent in an amount of 3 to 30 wt %, and even more preferably 5 to 20 wt %. Keeping the amount of glycol ether-based water-soluble organic solvent contained in the black ink composition at 3 wt % or higher improves the permeation of the ink into a recording medium, and in color printing, makes bleeding less likely to occur at the boundary between an image formed by the black ink of the present invention and an image formed by a colored ink. Keeping the amount of glycol ether-based water-soluble organic solvent contained in the black ink composition at 30 wt % or less not only makes bleeding less likely to occur when images are formed on a recording medium using this black ink composition, but also keeps the black ink composition in a uniform state, without separation. If the black ink composition separated, it would be necessary to add a dissolution auxiliary for dissolving the glycol ether-based water-soluble organic solvent in water and making the black ink composition more uniform, but since the addition of a dissolution auxiliary raises the viscosity of the black ink composition, it may be difficult to discharge the black ink composition from an inkjet head. The above-mentioned glycol ether-based water-soluble organic solvents can be used singly, or two or more types can be used together.

A surfactant can also be added to the black ink composition of the present invention. A nonionic surfactant is preferable as the surfactant used in the present invention. When a nonionic surfactant is added to the black ink composition of the present invention, the black ink composition permeates into the recording medium faster and is fixed more easily, and furthermore, the images formed by the ink droplets discharged onto the recording medium by an inkjet process will be more circular in shape, which affords higher quality of the resulting images.

It is preferable to use an acetylene glycol-based surfactant, for example, as the nonionic surfactant used in the present invention, although other types can also be used. It is particularly favorable for the acetylene glycol-based surfactant used in the black ink composition of the present invention to be a compound expressed by the following formula (17).

(17)

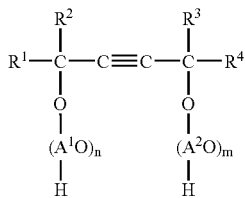

(In the formula (17), $R^1$, $R^2$, $R^3$, and $R^4$ are each independently a $C_1$ to $C_6$ linear, cyclic, or branched alkyl chain; $A^1O$ and $A^2O$ are each independently a $C_2$ or $C_3$ oxyalkylene chain, such as oxyethylene or oxypropylene, or a polyoxyalkylene chain obtained by polymerizing or copolymerizing a $C_2$ or $C_3$ alkylene oxide, such as a polyoxyethylene chain, polyoxypropylene chain, or polyoxyethylene-propylene chain; and n and m are the repeat numbers of the $A^1O$ and $A^2O$ units (that is, oxyalkylenes), and are numbers that satisfy $0 \leq n < 30$, $0 \leq m < 30$, and $0 \leq n+m < 50$). Examples of this acetylene glycol-based surfactant include Surfynol 465™ and Surfynol 104™ (both trade names of Air Products and Chemicals), and Olfin STG™ and Olfin™ E1010 (both trade names of Shin-Etsu Chemical Industries). One or more types selected from among these are preferably added to the black ink composition of the present invention.

In the present invention, it is preferable to add a surfactant to the black ink composition so that the surfactant content in the black ink composition will be 0.1 to 5 wt %, and even more preferably 0.5 to 2 wt %. Keeping the surfactant content at 0.1 wt % or less with respect to the black ink composition improves the permeation of the ink composition into the recording medium. Keeping the amount of surfactant contained in the black ink composition at no more than 5 wt % has the effect that the image formed on the recording medium by the black ink composition is less apt to bleed.

If desired, a humectant, viscosity regulator, pH regulator, and any other additives that can be used in black ink compositions can be added to the black ink composition of the present invention. Specifically, sodium alginate or another such water-soluble oligomer, or a water-soluble polymer, water-soluble resin, antioxidant, UV absorbent, preservative, anti-mildew agent, rustproofing agent, or the like can be added to the ink composition of the present invention. As long as the effect of the present invention is not compromised, a person skilled in the art can use the selected, favorable additives in any amount desired.

The black ink composition of the present invention preferably has a pH of from 7.0 to 9.0, and even more preferably 7.4 to 8.5, at 20° C. Keeping the pH of the ink composition at 20° C. to 7.0 or higher prevents eutectoid plating of the inkjet head from separating, and stabilizes the discharge characteristics of the ink composition from the inkjet head. Keeping the pH of the black ink composition at 20° C. to 9.0 or lower prevents the deterioration of the various members that come into contact with the black ink composition, such as ink cartridges and inkjet heads.

It is preferable to adjust the pH of the black ink composition at 20° C. to a favorable level by adding a pH regulator to the black ink composition of the present invention. For example, lithium hydroxide, sodium hydroxide, potassium hydroxide, and other such alkali metal hydroxides, and triethanolamine, diethanolamine, tripropanolamine, and other such amines can be used favorably as the pH regulator in the present invention. The amount in which the pH regulator is added to the black ink composition is an amount that will allow the pH of the black ink composition to fall within the above-mentioned preferred range, and this amount can be suitably determined. The pH of the black ink composition in the present invention is the value measured at 20° C. by direct insertion of a pH electrode into the black ink composition, using a commercially available pH meter.

One method that can be used to adjust the black ink composition of the present invention is to thoroughly mix and uniformly dissolve the various components to be contained in the black ink composition, then perform pressurized filtration with a membrane filter having an average aperture of 0.8 μm, and then perform defoaming under reduced pressure.

The black ink composition can be applied to ordinary writing implements, recording gauges, pen plotters, and so forth, but its use in an inkjet recording method is particularly favorable. Inkjet recording methods in which the black ink composition of the present invention can be used include any recording method in which a black ink composition is discharged in the form of droplets from a fine nozzle, and these droplets are made to adhere to a recording medium. Specific examples will now be given of inkjet recording methods in which the black ink composition of the present invention can be used.

The first method is called an electrostatic attraction method. This electrostatic attraction is a method in which a strong electric field is applied between a nozzle and an accelerating electrode disposed in front of the nozzle, ink droplets are continuously sprayed from the nozzle, an a printing information signal is imparted to deflecting electrodes while the ink droplets pass between these deflecting electrodes, which causes the ink droplets to fly toward the recording medium, and the ink is fixed on the recording medium, or a method in which the ink droplets are not deflected, but are instead sprayed from the nozzle toward the recording medium as directed by the printing information signal, so that images are fixed and recorded on the recording medium.

The second method involves applying pressure to ink droplets with a small pump, and mechanically vibrating the inkjet nozzle with a quartz oscillator, thereby forcibly spraying the ink droplets from the nozzle. The ink droplets sprayed from the nozzle are charged as they are sprayed, a printing information signal is imparted while these ink droplets pass between deflecting electrodes, and the ink droplets are made to fly toward the recording medium, thereby recording images on the recording medium. The ink composition of the present invention can be used to advantage in this recording method.

The third method involves simultaneously applying a printing information signal and pressure to the ink droplets with a piezoelectric device, spraying the ink droplets from the nozzle toward the recording medium, and recording images on this recording medium. The ink composition of the present invention can be used to advantage in this recording method.

The fourth method involves using micro-electrodes to heat and foam ink droplets according to a printing information signal, and swelling this foam so that the ink droplets are sprayed from the nozzle toward the recording medium, and images are recorded on the recording medium. The ink composition of the present invention can be used to advantage in this recording method.

The black water-based ink composition of the present invention is particularly favorable as a black ink composition used when images are formed on a recording medium by using an image recording method involving inkjet recording, including the four methods described above. The recorded material obtained using the black ink composition of the present invention has excellent image quality and also has excellent resistance to light and ozone.

EXAMPLES

The present invention will now be described in more specific terms through examples, but the present invention is not limited to or by the following examples.

[Preparation of Black Ink Composition]

The various components were mixed and uniformly dissolved in the amounts shown in Tables 1A and 1B below, after which the solutions thus obtained were filtered under pressure using a membrane filter with an average aperture of 0.8 μm, which yielded the black ink compositions of Examples 1 to 10 and Comparative Examples 1 to 9.

TABLE 1A

| | Ink components | | | | | | | | | | | |
|---|---|---|---|---|---|---|---|---|---|---|---|---|
| | Black dye 1 | C.I. Direct Red 227 | Magenta dye 1 | C.I. Direct Yellow 88 | C.I. Direct Black 154 | C.I. Direct Black 168 | C.I. Direct Black 195 | C.I. Direct Red 118 | C.I. Direct Red 144 | C.I. Direct Red 147 | C.I. Direct Violet 16 | C.I. Direct Yellow 173 |
| Type of dye | black | magenta | magenta | yellow | black | black | black | magenta | magenta | magenta | magenta | yellow |
| Ex. 1 | 5.00% | 0.60% | | 0.80% | | | | | | | | |
| Ex. 2 | 5.00% | | 0.60% | 0.80% | | | | | | | | |
| Ex. 3 | 5.00% | 0.80% | | 1.00% | | | | | | | | |
| Ex. 4 | 5.00% | | 0.80% | 1.00% | | | | | | | | |
| Ex. 5 | 5.00% | 0.60% | | 0.20% | | | | | | | | |
| Ex. 6 | 5.00% | 0.60% | | 1.60% | | | | | | | | |
| Ex. 7 | 5.00% | 0.10% | | 0.80% | | | | | | | | |
| Ex. 8 | 5.00% | 1.60% | | 0.80% | | | | | | | | |
| Ex. 9 | 5.00% | | 0.10% | 0.80% | | | | | | | | |
| Ex. 10 | 5.00% | | 1.60% | 0.80% | | | | | | | | |
| C. E. 1 | | | | | 5.00% | | | | | | | |
| C. E. 2 | | | | | | 5.00% | | | | | | |
| C. E. 3 | | | | | | | 5.00% | | | | | |
| C. E. 4 | 5.00% | | | 0.80% | | | | 0.60% | | | | |
| C. E. 5 | 5.00% | | | 0.80% | | | | | 0.60% | | | |
| C. E. 6 | 5.00% | | | 0.80% | | | | | | 0.60% | | |
| C. E. 7 | 5.00% | | | 0.80% | | | | | | | 0.60% | |
| C. E. 8 | 5.00% | 0.60% | | | | | | | | | | 0.80% |
| C. E. 9 | 5.00% | | | | | | | | | | | |

TABLE 1B

Ink components (continued)

| | Glycerol | Triethylene glycol monobutyl ether | Triethylene glycol | 2-Pyrrolidone | Tripropanolamine | Adipic acid | Olfin E1010 | Proxel XL-2 | Ultra-pure water | Total |
|---|---|---|---|---|---|---|---|---|---|---|
| Ex. 1 | 9.6% | 10.00% | 1.00% | 1.50% | 0.30% | 0.04% | 0.80% | 0.30% | 70.06% | 100% |
| Ex. 2 | 9.6% | 10.00% | 1.00% | 1.50% | 0.30% | 0.04% | 0.80% | 0.30% | 70.06% | 100% |
| Ex. 3 | 9.2% | 10.00% | 1.00% | 1.50% | 0.30% | 0.04% | 0.80% | 0.30% | 70.06% | 100% |
| Ex. 4 | 9.2% | 10.00% | 1.00% | 1.50% | 0.30% | 0.04% | 0.80% | 0.30% | 70.06% | 100% |
| Ex. 5 | 10.0% | 10.00% | 1.20% | 1.50% | 0.30% | 0.04% | 0.80% | 0.30% | 70.06% | 100% |
| Ex. 6 | 8.8% | 10.00% | 1.00% | 1.50% | 0.30% | 0.04% | 0.80% | 0.30% | 70.06% | 100% |
| Ex. 7 | 10.0% | 10.00% | 1.10% | 1.50% | 0.30% | 0.04% | 0.80% | 0.30% | 70.06% | 100% |
| Ex. 8 | 8.6% | 10.00% | 1.00% | 1.50% | 0.30% | 0.04% | 0.80% | 0.30% | 70.06% | 100% |
| Ex. 9 | 10.0% | 10.00% | 1.10% | 1.50% | 0.30% | 0.04% | 0.80% | 0.30% | 70.06% | 100% |
| Ex. 10 | 8.6% | 10.00% | 1.00% | 1.50% | 0.30% | 0.04% | 0.80% | 0.30% | 70.06% | 100% |
| C. E. 1 | 10.0% | 10.00% | 2.00% | 1.50% | 0.30% | 0.04% | 0.80% | 0.30% | 70.06% | 100% |
| C. E. 2 | 10.0% | 10.00% | 2.00% | 1.50% | 0.30% | 0.04% | 0.80% | 0.30% | 70.06% | 100% |
| C. E. 3 | 10.0% | 10.00% | 2.00% | 1.50% | 0.30% | 0.04% | 0.80% | 0.30% | 70.06% | 100% |
| C. E. 4 | 10.0% | 10.00% | 1.40% | 1.50% | 0.30% | 0.04% | 0.80% | 0.30% | 70.06% | 100% |
| C. E. 5 | 10.0% | 10.00% | 1.40% | 1.50% | 0.30% | 0.04% | 0.80% | 0.30% | 70.06% | 100% |
| C. E. 6 | 10.0% | 10.00% | 1.40% | 1.50% | 0.30% | 0.04% | 0.80% | 0.30% | 70.06% | 100% |
| C. E. 7 | 10.0% | 10.00% | 1.40% | 1.50% | 0.30% | 0.04% | 0.80% | 0.30% | 70.06% | 100% |
| C. E. 8 | 10.0% | 10.00% | 1.20% | 1.50% | 0.30% | 0.04% | 0.80% | 0.30% | 70.06% | 100% |
| C. E. 9 | 10.0% | 10.00% | 2.00% | 1.50% | 0.30% | 0.04% | 0.80% | 0.30% | 70.06% | 100% |

The black dye 1 in Table 1A is a lithium salt of a compound expressed by the following the formula (7).

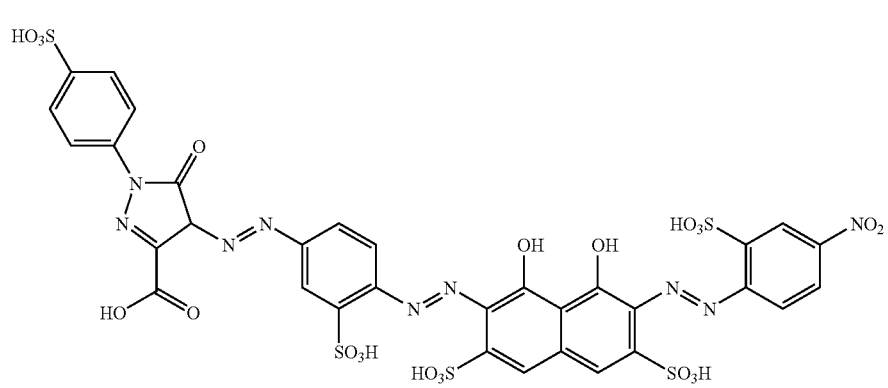

(7)

This black dye 1 is an example of an alkali metal salt of a compound expressed by the formula (1) or (2) above.

The magenta dye 1 in Table 1A is expressed by the following formula (18).

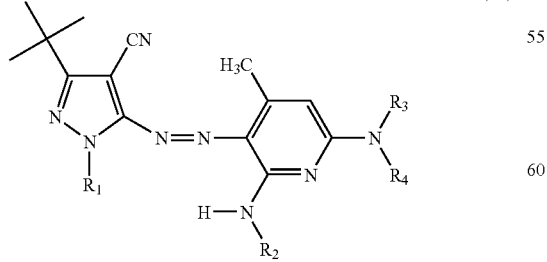

(18)

In the formula (18), $R_1$, $R_2$, $R_3$, and $R_4$ are the groups shown in the following table.

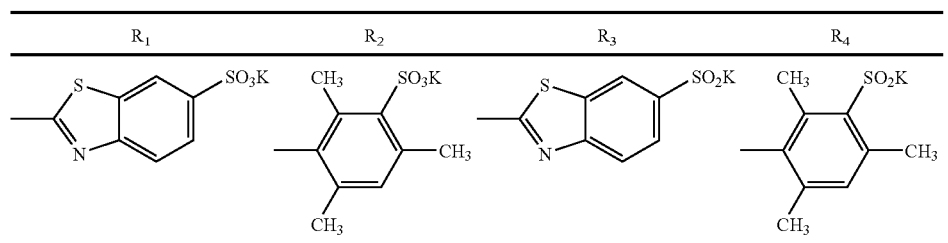

The magenta dye 1 above is an example of an alkali metal salt of a compound expressed by the formula (5) or (6) above.

The C.I. Direct Red 227 in Table 1A is a dye that contains no primary amino groups, is not an ammonium salt, and is not a salt with an organic cation.

The other dyes used in these examples and comparative examples are known dyes, and their chemical structural formulas are given below.

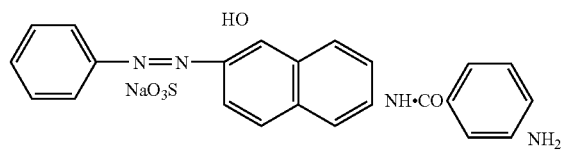

[C.I.Direct Red 118]

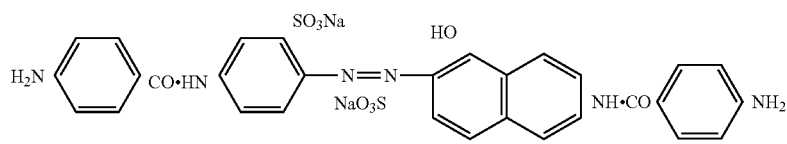

[C.I.Direct Red 147]

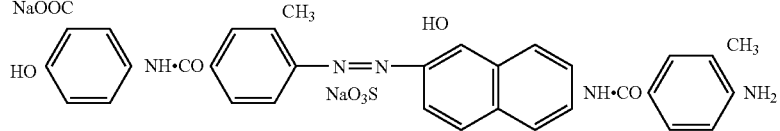

[C.I.Direct Red 144]

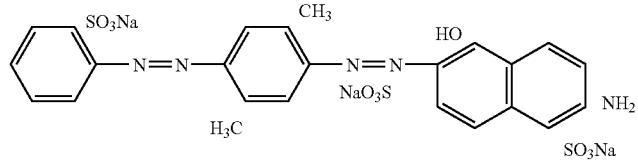

[C.I.Direct Violet 16]

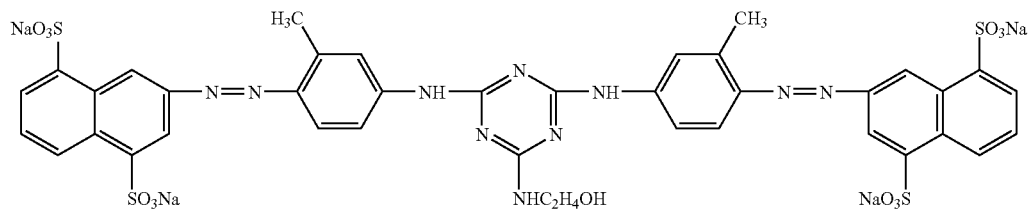

[C.I.Direct Yellow 86]

-continued

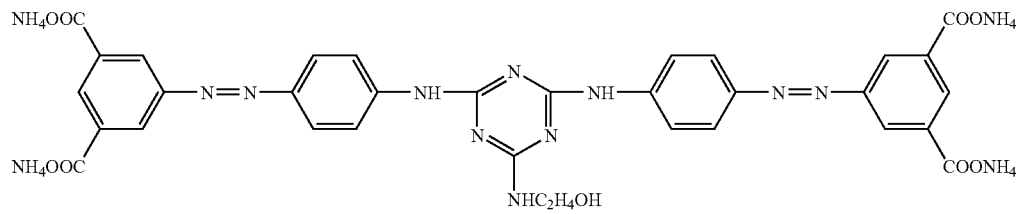

[C.I.Direct Yellow 173]

Printing of Test-Use Recorded Material

A printing test was conducted using a Stylus Color 880™ (trade name of Seiko-Epson) inkjet printer. A special black ink cartridge for this printer was filled with each of the black ink compositions of Examples 1 to 10 and Comparative Examples 1 to 9, and recorded material was obtained by printing monochromatic images on PM Photographic Paper (trade name of Seiko-Epson, model KA420PSK). This printing was performed by adjusting the duty so that the OD (optical density) of the resulting images would fall between 0.9 and 1.1. The recorded material thus obtained was left for 1 day in a dark place at room temperature, after which various tests were conducted as follows for the light and ozone resistance of the recorded images. The resulting recorded material was also measured for the hue of the images.

[Light Resistance Test]

Using an SFT-II Fluorescent Light Tester (trade name of Suga Test Instruments), a light resistance test was conducted by irradiating the above-mentioned recorded material with light for 21 days at a temperature of 24° C., a humidity of 60% RH, and a luminance of 70,000 lux. Using a Spectrolino™ Reflection Densitometer (trade name of Gretag), the OD of the images of the recorded material was measured before and after irradiation with light. The OD value was measured using a D50 light source, with no light source filter, using absolute white as the white reference, and at a visibility angle of 2°. The relict optical density (ROD) of the images of the various recorded material after light irradiation was calculated from the measured value (OD value) thus obtained using the following Calculation Formula 1:

$$ROD(\%) = D_A/D_B \times 100$$

(where $D_A$ is the OD of the image after completion of the light irradiation test, and $D_B$ is the OD of the image before completion of the light irradiation test.

The light resistance of the recorded material was evaluated by grading the test results from A to D using the following criteria, on the basis of the resulting ROD.

A: ROD is at least 80%
B: ROD is at least 60%, but less than 80%
C: ROD is at least 40%, but less than 60%
D: ROD is less than 40%

It is preferable for the ROD value to be higher, because there will be less deterioration of the images due to light irradiation. The results thus obtained are given in Table 2.

[Ozone Resistance (Gas Resistance) Test]

Using an OMS-H Ozone Weather-o-meter (trade name of Suga Test Instruments), the above-mentioned recorded material was exposed to ozone for 24 hours at a temperature of 24° C., a humidity of 60% RH, and an ozone concentration of 10 ppm. The OD of the recorded material before and after ozone exposure was measured using a Spectrolino™ Reflection Densitometer (trade name of Gretag). This measurement was conducted using a D50 light source, with no light source filter, using absolute white as the white reference, and at a visibility angle of 2°. The ozone resistance of the recorded material was evaluated by grading the results from A to D using the same calculation method as in the above-mentioned light resistance test and the same grading criteria as in the above-mentioned light resistance test. Table 2 shows the evaluation results thus obtained, along with the above-mentioned light resistance test results. The higher is the ROD value, the less deterioration of the images is caused by ozone exposure. It can be seen from the results in Table 2 that the black ink composition of the present invention has superior light resistance and ozone resistance (gas resistance).

TABLE 2

| | Image stability | |
| --- | --- | --- |
| | Light resistance | Gas resistance |
| Example 1 | A | A |
| Example 2 | A | A |
| Example 3 | A | A |
| Example 4 | A | A |
| Comparative Example 1 | D | C |
| Comparative Example 2 | C | D |
| Comparative Example 3 | D | B |

[Ink Stability Test]

Each of the black ink compositions in Examples 1 to 4 and Comparative Examples 4 to 8 was stored for 6 days at 70° C. and subjected to a storage stability test. The black ink composition prior to the test, and the black ink composition that had undergone the test were each diluted 2000 times (by volume) with ultra-pure water, and the absorbency was measured with a spectrograph. The absorbency at the maximum absorption wavelength (λmax) of the ink composition prior to the storage stability test was compared before and after the storage stability test, and the change in the absorbency caused by the storage stability test was calculated as the "persistence" from the following calculation formula.

Persistence(%)={(absorbency of ink after storage for 6 days at 70° C.) ÷(initial absorbency of ink)}× 100

Table 3 shows the results for "persistence" thus obtained, along with the "difference in maximum absorption wavelength (Δ nm) before and after the storage stability test. It can be seen that the persistence is higher in Examples 1 to 4 than in Comparative Examples 4 to 8. Specifically, with the black ink compositions containing the preferred magenta dye and yellow dye of the present invention for adjusting the hue of the black dye, there was less change in the maximum absorption wavelength of the black ink composition before and after the storage stability test, and the "persistence" before and after the test was better.

TABLE 3

Ink stability

λmax (maximum absorption wavelength)

|  | Initial | 6 days at 70° C. | Δ nm | Persistence |
|---|---|---|---|---|
| Example 1 | 575 nm | 575 nm | 0 nm | 97.9% |
| Example 2 | 573 nm | 572 nm | −1 nm | 97.7% |
| Example 3 | 575 nm | 575 nm | 0 nm | 98.0% |
| Example 4 | 573 nm | 572 nm | −1 nm | 97.7% |
| Comparative Ex. 4 | 575 nm | 567 nm | −8 nm | 97.2% |
| Comparative Ex. 5 | 574 nm | 566 nm | −8 nm | 97.0% |
| Comparative Ex. 6 | 575 nm | 568 nm | −7 nm | 97.1% |
| Comparative Ex. 7 | 576 nm | 571 nm | −5 nm | 95.0% |
| Comparative Ex. 8 | 576 nm | 569 nm | −7 nm | 94.2% |

[Hue of Black Ink Composition]

The hue of the images of the above-mentioned recorded material was measured using a Spectrolino™ Reflection Densitometer (trade name of Gretag). Table 4 shows the results of measuring the hue as the a, b, and c* values. There is a relation of $c^* = (a^2+b^2)^{0.6}$. The hue of the images was also evaluated visually, an image that appeared most neutral was termed "most favorable hue," one that had just a tinge of cyan or other color was termed "favorable hue," and those that were clearly cyan, green, or violet in color were termed "cyan," "green," and "violet." Table 4 shows the results thus obtained. When the yellow dye and magenta dye were the preferred dyes of the present invention (Examples 1 to 4), the images obtained using black ink compositions containing these dyes had smaller c* values and also had favorable hues in the visual evaluation. In Examples 5 to 10, the proportions in which the yellow dye and magenta dye were added with respect to the black dye were outside the particularly favorable range described in this Specification, but the c* value was smaller and the hue was better than when no yellow dye or magenta dye was used (Comparative Example 9).

TABLE 4

|  | Hue | | | |
|---|---|---|---|---|
|  | a value | b value | c* value | Visual evaluation |
| Example 1 | −2.42 | −4.46 | 5.07 | favorable hue |
| Example 2 | −2.35 | −4.20 | 4.81 | favorable hue |
| Example 3 | −1.44 | −1.52 | 2.09 | most favorable hue |
| Example 4 | −1.41 | −1.43 | 2.01 | most favorable hue |
| Example 5 | −2.51 | −5.51 | 60.5 | cyan |
| Example 6 | −2.40 | −0.55 | 2.46 | green |
| Example 7 | −5.51 | −4.39 | 7.05 | cyan |
| Example 8 | 2.11 | −4.48 | 4.95 | violet |
| Example 9 | −5.46 | −4.23 | 6.91 | cyan |
| Example 10 | 2.04 | −4.17 | 4.64 | violet |
| Comparative Ex. 9 | −5.73 | −5.88 | 8.21 | cyan |

What is claimed is:

1. A black water-based ink composition, containing:

at least one type of black dye selected from the group consisting of compounds expressed by the following formula (1) and salts thereof:

(1)

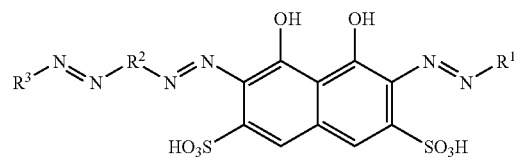

wherein, in (the formula (1), $R^1$ is a phenyl group having a substituent or a naphthyl group having a substituent, $R^2$ is a phenylene group having a substituent or a naphthylene group having a substituent, $R^3$ is a 5- to 7-member heterocyclic group having a substituent and at least one double bond, and the substituents in $R^1$ to $R^3$ are independently selected from the group consisting of OH, $SO_3H$, $PO_3H_2$, $CO_2H$, $NO_2$, $C_1$ to $C_4$ alkyl groups, alkyl groups having a substituent, $C_1$ to $C_4$ alkoxy groups, alkoxy groups having a substituent, amino groups having a substituent, and phenyl groups having a substituent), and at least one yellow dye and one magenta dye, wherein each of the yellow dye and magenta dye is a compound that has at least one type of group selected from the group consisting of an —$SO_3H$ group, —COOH group, —$SO_3M$ group, and —COOM group, where M in these groups is an alkali metal atom, has no primary amino group, and is not an ammonium salt or a salt with an organic cation, wherein the yellow dye and magenta dye provide the ink composition with a hue that is different than a hue of the black dye.

2. The black water-based ink composition according to claim 1, wherein the compound expressed by the formula (1) is a compound expressed by the following formula (2)

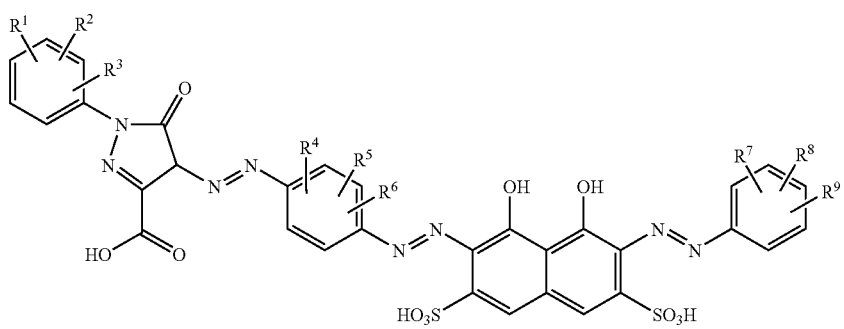

wherein, in (the formula (2)), $R^1$ to $R^9$ are independently selected from the group consisting of H, OH, $SO_3H$, $PO_3H_2$, $CO_2H$ and $NO_2$.

3. The black water-based ink composition according to claim 1, wherein the yellow dye is at least one type selected from the group consisting of compounds expressed by the following formula (3):

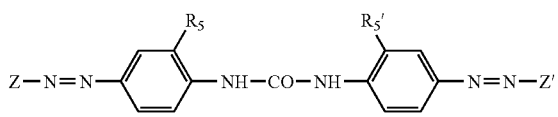

and the following formula (4):

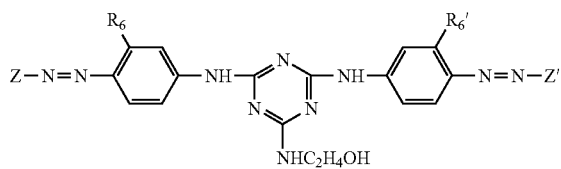

wherein, in (the formulas (3) and (4), $R_5$, $R_5'$, $R_6$, and $R_6'$ are independently $CH_3$ or $OCH_3$; Z and Z' independently have one of the structures expressed by the following formulas, and may be the same or different from each other:

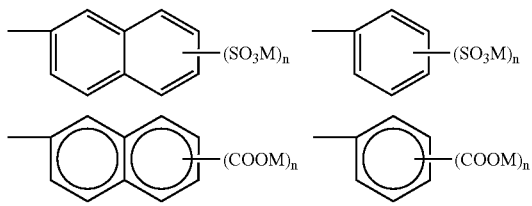

where (M is independently H, Li, Na, or K, and n is an integer of 1 or 2.

4. The black water-based ink composition according to claim 1, wherein the magenta dye is at least one type selected from the group consisting of compounds expressed by the following formula (5) and alkali metal salts thereof:

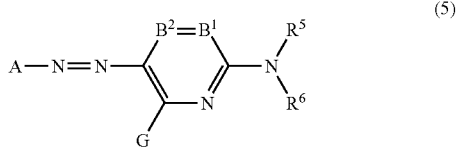

wherein, in (the formula (5), A is a residue of a 5-member heterocyclic diazo component $A-NH_2$; $B^1$ and $B^2$ are respectively $-CR^1=$ and $CR^2=$, or one is a nitrogen atom and the other is $-CR^1=$ or $-CR^2=$; $R^5$ and $R^6$ are each independently a hydrogen atom, aliphatic group, aromatic group, heterocyclic group, acyl group, alkoxycarbonyl group, aryloxycarbonyl group, carbamoyl group, alkylsulfonyl group, arylsulfonyl group, or sulfamoyl group, and each group may have a substituent; G, $R^1$, and $R^2$ are each independently a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, an amino group substituted with an alkyl group, an aryl group, or a heterocyclic group, acylamino group, ureido group, sulfamoylamino group, alkoxycarbonylamino group, aryloxycarbonylamino group, alkyl- or arylsulfonylamino group, nitro group, alkyl- or arylthio group, alkyl- or arylsulfonyl group, alkyl- or arylsulfinyl group, sulfamoyl group, sulfo group, or heterocyclic thio group, and each group may have a substituent; and $R^1$ and $R^5$, and $R^5$ and $R^6$ may bond together to form a 5- or 6-member ring, and C.I. Direct Red 227.

5. The black water-based ink composition according to claim 4, wherein the compounds expressed by the formula (5) and alkali metal salts thereof are compounds expressed by the following formula (6) and alkali metal salts thereof:

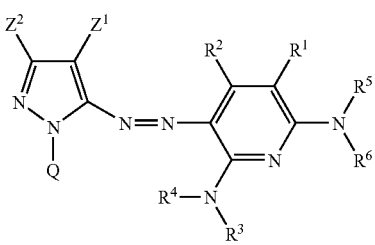

wherein, in (the formula (6), $Z^1$ is an electron withdrawing group with a Hammett's substituent constant $s_p$ value of at least 0.20; $Z^2$ is a hydrogen atom, aliphatic group, aromatic group, or heterocyclic group; $R^1$, $R^2$, $R^5$, and $R^6$ are defined the same as for the formula (5); $R^3$ and $R^4$ are each independently a hydrogen atom, aliphatic group, aromatic group, heterocyclic group, acyl group, alkoxycarbonyl group, aryloxycarbonyl group, carbamoyl group, sulfonyl group, or sulfamoyl group; Q is a hydrogen atom, aliphatic group, aromatic group, or heterocyclic group; and each of the above groups $Z^1$, $Z^2$, $R^1$ to $R^6$ and Q may have a substituent).

6. The black water-based ink composition according to claim 1, wherein the yellow dye is at least one type selected from the group consisting of compounds expressed by the formula (3) and compounds expressed by the formula (4), and the magenta dye is at least one type selected from the group consisting of compounds expressed by the formula (5) and alkali metal salts thereof, compounds expressed by the formula (6) and alkali metal salts thereof, and C.I. Direct Red 227.

7. The black water-based ink composition according to claim 1, wherein the black dye is contained in an amount of 0.5 to 12.0 wt % with respect to the total weight of the black water-based ink composition.

8. The black water-based ink composition according to claim 2, wherein the black dye is contained in an amount of 0.5 to 12.0 wt % with respect to the total weight of the black water-based ink composition.

9. The black water-based ink composition according to any of claim 1, wherein the yellow dye is contained in an amount of 0.03 to 3.0 wt % with respect to the total weight of the black water-based ink composition.

10. The black water-based ink composition according to any of claim 1, wherein the magenta dye is contained in an amount of 0.02 to 3.0 wt % with respect to the total weight of the black water-based ink composition.

11. The black water-based ink composition according to claim 3, wherein the black dye and the yellow dye are contained in a weight ratio between 15:1 and 10:3.

12. The black water-based ink composition according to claim 4, wherein the black dye and the magenta dye are contained in a weight ratio between 25:1 and 10:3.

13. An inkjet recording method, wherein the black water-based ink composition according to claim 1 is discharged in the form of droplets from a narrow nozzle, and these droplets are made to adhere to a recording medium.

14. Recorded material, which has been printed by the inkjet recording method according to claim 13.

15. The black water-based ink composition according to claim 1, wherein the at least one black dye, yellow dye and magenta dye are present in the ink composition in respective amounts effective to provide the ink composition with a hue that is more neutral in appearance than a hue of the at least one black dye alone.

* * * * *